(12) United States Patent
Rela

(10) Patent No.: US 6,607,668 B2
(45) Date of Patent: Aug. 19, 2003

(54) WATER PURIFIER

(75) Inventor: Matthew Rela, Monroe Township, NJ (US)

(73) Assignee: Technology Ventures, Inc., Charlestown (KN)

( * ) Notice: Subject to any disclaimer, the term of this patent is extended or adjusted under 35 U.S.C. 154(b) by 0 days.

(21) Appl. No.: 09/932,437

(22) Filed: Aug. 17, 2001

(65) Prior Publication Data

US 2003/0034292 A1 Feb. 20, 2003

(51) Int. Cl.[7] .................. B01D 63/00; B01D 35/00; B01D 24/00; B01D 61/00; C02F 1/44
(52) U.S. Cl. .................. 210/321.6; 210/87; 210/90; 210/143; 210/269; 210/652; 210/650
(58) Field of Search .................. 210/232, 321.6, 210/652, 257.2, 663, 639, 195.1, 195.2, 120, 188, 282, 288, 90, 103, 143, 484, 497.01, 96.1, 97, 87, 269

(56) References Cited

U.S. PATENT DOCUMENTS

| | | | |
|---|---|---|---|
| 3,870,033 A | * | 3/1975 | Faylor et al. ............ 392/470 |
| 4,280,912 A | | 7/1981 | Berry, III et al. |
| 4,340,478 A | | 7/1982 | Stannard et al. |
| 4,587,016 A | | 5/1986 | Sumiyoshi |
| 4,753,728 A | | 6/1988 | VanderBilt et al. |
| 4,808,287 A | | 2/1989 | Hark |
| 4,946,047 A | | 8/1990 | Kurokawa et al. |
| 5,021,157 A | | 6/1991 | Drake et al. |
| 5,024,766 A | | 6/1991 | Mahmud |
| 5,059,317 A | | 10/1991 | Marius et al. |
| 5,064,534 A | | 11/1991 | Busch et al. |
| 5,126,050 A | | 6/1992 | Irvine et al. |
| 5,180,491 A | * | 1/1993 | Polasky .................. 210/282 |
| 5,252,206 A | | 10/1993 | Gonzalez |
| 5,470,461 A | | 11/1995 | Ban et al. |
| 5,512,178 A | | 4/1996 | Dempo |
| 5,547,584 A | | 8/1996 | Capehart |
| 5,573,666 A | * | 11/1996 | Korin .................. 210/232 |
| 5,685,986 A | | 11/1997 | Yamada et al. |
| 5,698,091 A | | 12/1997 | Kuennen et al. |
| 5,700,371 A | | 12/1997 | Koslow |
| 5,741,416 A | | 4/1998 | Tempest, Jr. |
| 5,911,884 A | | 6/1999 | Boulter |
| 5,919,357 A | * | 7/1999 | Wilkins et al. ............ 210/120 |
| 5,972,216 A | | 10/1999 | Acernese et al. |
| 6,001,249 A | | 12/1999 | Bailey et al. |
| 6,051,140 A | | 4/2000 | Perry |
| 6,080,313 A | | 6/2000 | Kelada |
| 6,086,754 A | | 7/2000 | Watanabe |
| 6,228,255 B1 | * | 5/2001 | Peterson et al. ............ 210/90 |
| 6,398,965 B1 | * | 6/2002 | Arba et al. ............ 210/652 |

* cited by examiner

*Primary Examiner*—Joseph Drodge
*Assistant Examiner*—Krishnan S Menon
(74) *Attorney, Agent, or Firm*—Muserlian, Lucas & Mercanti, LLP

(57) ABSTRACT

Water purifier using membranes, ion exchange resins and electricity to remove ionic, organic and suspended impurities from water to produce high quality, pure water. Supply water is pre-treated by directing it first into a sediment pre-filter module, a softener module and a sediment removal and dechlorination module. The pre-treated water is supplied to a reverse osmosis module which separates the water into two streams (a purified water stream and a concentrate stream) by collecting fluids from both sides of pressurized membranes. The purified water is passed to an electrodeionization module which further purifies the water and directs the water to an ultraviolet sterilization module. The concentrate stream is divided into a recycle stream which is passed to the inlet of the reverse osmosis module and a waste concentrate stream which flows to an outlet of the machine. A control method for the water purifier is also disclosed.

29 Claims, 13 Drawing Sheets

WATER PURIFIER

FIELD OF THE INVENTION

The present invention relates to a water purifier which delivers a high quality, pure stream of water.

The present invention also relates to a method for controlling a water purifier to optimize the production of pure water by the water purifier.

BACKGROUND OF THE INVENTION

The need for water purifiers is expanding as water purifiers are needed for the electronic, pharmaceutical and power industries and purified water is needed for the food, beverage and chemical industries. Pure water is also needed for research purposes, pilot facilities and laboratories.

Generally, water purifiers include one or more filtering components and means for directing water through the filtering component(s) so that impurities in the water are removed during passage of the water through the water purifier. Raw, impure water is directed into the water purifier through an inlet and a pure stream of water is obtained from an outlet of the water purifier. The time in which the water remains in each filtering component is often regulated to ensure adequate purification of the water.

In the prior art, there are numerous patents and publications directed to water purifiers. In particular, reference is made to the following U.S. patents:

U.S. Pat. No. 6,086,754 (Watanabe) describes a water purifier including a timer which controls valves to provide for proper sterilization of the water. The valves are associated with components such as a purification unit, a filter and electrodes. For example, the timer controls the energizing period of the electrodes to ensure that water is heated sufficiently to sterilize it.

Also, U.S. Pat. No. 6,080,313 (Kelada) describes a water purifier with several purification and filtration units in a common housing (see FIG. 1). A flowboard serves as a base of the water purifier and has several mounting assemblies designed to receive different cartridges. Each cartridges has a different function, for example, an activated carbon filter cartridge and a disinfection cartridge. The type of cartridge and the order of the cartridges can be varied to provide for any number of different flow arrangements. A circuit may be included to shut the unit down if the concentration of dissolved solids exceeds a preset limit, e.g., when the water purifier is not providing sufficiently pure water.

U.S. Pat. No. 5,741,416 (Tempest, Jr.) describes a water purifier in which the quality of the water at the outflow is determined by measuring its electrical potential and if the electrical potential indicates that the water is not sufficiently pure, then the water is diverted through a feedback loop to pass through for additional purification treatment.

U.S. Pat. No. 5,698,091 (Kuennen et al.) describes a water purifier with a carbon block filter. A flow regulator is provided to ensure that the system operates at an adequate pressure and provides for an adequate exposure time. Specifically, the flow of water through the filter is measured and if it falls below a preset limit, indicative of blockage in the filter, an audio and/or visual indication is provided indicating that the filter needs to be changed.

U.S. Pat. No. 5,547,584 (Capchart) describes a self-contained water purifier (which presumably means that the components are situated in a common housing) including filter components and pumps which control flow of the water through the purifier. A programmable logic controller is associated with the pumps and pressure switches to control operation of the system and shut the system down when an indication of a malfunction is detected.

U.S. Pat. No. 5,126,050 (Irvine et al.) describes a water treatment apparatus including a microprocessor which controls pumps and valves to provide for desired flows through the apparatus.

The water purifiers described in these patents do not include a particular combination of purification and filtering components as in the invention nor do these patents describe a method for controlling a water purifier to optimize the production of pure water as in the invention.

OBJECTS OF THE INVENTION

It is an object of the present invention to provide a new and improved water purifier.

It is another object of the present invention to provide a new and improved water purifier which produces a high quality, pure water stream.

It is yet another object of the present invention to provide a new and improved water purifier including several purification/filtration modules which are controlled to achieve overall optimum performance of the water purifier.

It is still another object of the present invention to provide a new and improved water purifier including several purification/filtration modules whose operation is monitored and adjusted if necessary to achieve overall optimum performance of the water purifier.

It is yet another object of the present invention to provide a new and improved method for controlling components in a water purifier with a view toward optimizing and/or maximizing the purification of water, and/or achieving optimum overall performance.

SUMMARY OF THE INVENTION

In order to achieve one or more of the objects set forth above, a general embodiment of a water purifier in accordance with the invention has a novel combination of purification and/or filtration components. Further, the water purifier including the purification and/or filtration components is controlled by controlling the individual components in a specific manner.

The water purifier uses membranes, ion exchange resins and electricity to remove ionic, organic and suspended impurities from water, producing a high quality, pure water stream. In the water purifier, raw or supply water is pretreated by directing it first into a sediment pre-filter module, then into a softener module and then into a sediment removal and dechlorination module. The pre-treated water is then supplied in a controlled manner to a reverse osmosis module which separates the water into two streams (a purified water stream and a concentrate stream) by collecting fluids from both sides of pressurized membranes in the reverse osmosis module. The purified water stream is passed to an electro-deionization module which further purifies the water and directs the water to an ultraviolet sterilization module from which pure water is obtained. The concentrate stream is divided into a recycle stream which is passed to the inlet of the reverse osmosis module and a waste concentrate stream which flows to an outlet of the machine.

An important feature of the invention is the presence of a central microprocessor which utilizes a proprietary program to control the modules, valves and pumps to ensure satisfactory water quality and operation of the machine. The microprocessor is coupled to various monitors and sensors associated with the modules and determines the necessary or allowable operation of the valves and pumps. If the valves or pumps deviate from the necessary or allowable operation, the control system is programmed to either automatically correct the deviation or to notify the operator that manual correction is necessary. In this manner, the water purifier will not operate is the conditions for generating pure water are not proper.

One exemplifying embodiment of the water purifier in accordance with the invention comprises a softener module arranged to receive the supply water and remove metallic ions from the water, a de-chlorination module arranged to receive water from the softener module and remove oxidizing and organic compounds from the water, a control valve arranged downstream of the de-chlorination module for regulating flow of water from the de-chlorination module, a reverse osmosis module arranged downstream of the control valve and comprising reverse osmosis membranes which purify the water upon flow of water through the membranes, a pump arranged between the control valve and the reverse osmosis module for pump water at a high pressure through the reverse osmosis module, an electrodeionization module arranged to receive water from the reverse osmosis module and remove ions from the water to provide a stream of pure water, and a control system for controlling operation of the softener module, the de-chlorination module, the control valve, the reverse osmosis module, the pump, the electrodeionization module and the ultraviolet sterilization module to optimize purification of the supply water.

The control valve, pump and modules mentioned above may be arranged in connection with a frame forming a self-contained unit, e.g., arranged in an interior space defined by the frame.

The control system is coupled to various monitors associated with the modules including a flow monitor associated with the softener module for measuring rate of flow of water into the softener module. The control system determines processing capacity of the softener module based on the measured flow rate and initiates regeneration of the softener module, e.g., regeneration of sodium ion resins in a tank, based on analysis of the determined processing capacity of the softener module and a pre-determined capacity of the sodium ion resins.

Another flow monitor is associated with the de-chlorination module for measuring rate of flow of water into the de-chlorination module. An indicator visible from exterior of the water purifier is preferably provided. The control system determines processing capacity of carbon elements of the de-chlorination module and controls the indicator to provide an indication when replacement of the carbon elements is required.

Other monitors include a water quality monitor for measuring ionic concentration in the water, a temperature monitor for measuring temperature of the water, and a pressure monitor for measuring pressure of the water. The control system is preferably designed to activate an indicator or alarm when the measured ionic concentration, temperature or pressure of the water is outside of an operational range and/or user pre-set value.

Another monitor is a water quality monitor for measuring ionic concentration in pure water outlet from the electrodeionization module. The control system calculates electrical voltage and current required by the electrodeionization module and automatically adjusts each to achieve optimum outlet water quality, if such adjustment is necessary.

An optional sediment pre-filter module may be arranged before the softener module and removes particles from the supply water. Pressure sensors measures pressure of ceramic elements of the sediment pre-filter module at an inlet end of the module and at an outlet end of the module. The control system analyzes the pressure readings and determines when the sediment pre-filter module is performing below a threshold satisfaction level indicative of the need to clean the ceramic elements.

Another optional module is an ultraviolet sterilization module arranged after the electrodeionization module and is constructed to eliminate bacteria from the water such that the pure water stream is provided from the ultraviolet sterilization module.

A method for controlling a water purifier including in sequence a softener module, a de-chlorination module, a pump, a reverse osmosis module and an electrodeionization module, entails controlling the softener module, de-chlorination module, reverse osmosis module and the electrodeionization module. Control of the softener module may entail measuring flow rate of water into the softener module, determining whether the processed volume of water by the softener module exceeds the volumetric softening capacity of the softener module, and directing regeneration of the softener module when the processed volume of water exceeds the volumetric softening capacity. Control of the de-chlorination module may entail measuring flow rate of water into the de-chlorination module, determining whether the processed volume of water by the de-chlorination module exceeds the processing capacity of the de-chlorination module, and directing replacement of the de-chlorination module when the processed volume of water exceeds the processing capacity. Control of the reverse osmosis module may entail measuring the flow rate and pressure of an RO permeate stream and an RO concentrate stream generated by the reverse osmosis module, determining whether the flow rates and pressure of the RO permeate stream and RO concentrate stream are within allowable operating margins or non-optimal, and adjusting valves to change at least one of the flow rate and pressure of the RO permeate stream and RO concentrate stream when the flow rates and pressure of the RO permeate stream and RO concentrate stream are determined to be outside of allowable operating margins or non-optimal. Control of the electrodeionization module may entail measuring the flow rate and pressure of an EDI process stream, an EDI electrode stream and an EDI concentrate stream which pass separately through the electrodeionization module, determining whether the flow rates and/or pressure of the EDI process stream, EDI electrode stream and EDI concentrate stream are within allowable operating margins and/or non-optimal, and adjusting valves to change the flow rate and/or pressure of the RO permeate stream and/or RO concentrate stream when the flow rates and/or pressure of the RO permeate stream and/or RO concentrate stream are determined to be outside of allowable operating margins or non-optimal.

The method may also include measuring ionic concentration in the water at a location in the water purifier which is indicative of the quality of the water, determining whether the measured ionic concentration is within allowable margins and optimal, and adjusting the electrodeionization module when the measured ionic concentration is determined to be outside of the allowable margins or non-optimal. Instead of or in addition to adjusting the electrodeionization module, an indicator or warning device may be activated.

The temperature of the water can be measured at a location in the water purifier, a determination is made if the temperature of the water is outside of allowable margins and if so, an indicator or warning device is activated.

Other enhancements of the method include measuring pressure of the water at the softener module, determining if the pressure of the water is outside of allowable margins, and activating an indicator or warning device when the pressure is determined to be outside of allowable margins. Another enhancement is to monitor time of operation of the pump and activate an indicator or warning device when maintenance of the pump is required as determined by elapsed time of operation of the pump.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE PREFERRED EMBODIMENTS

Figure 1:
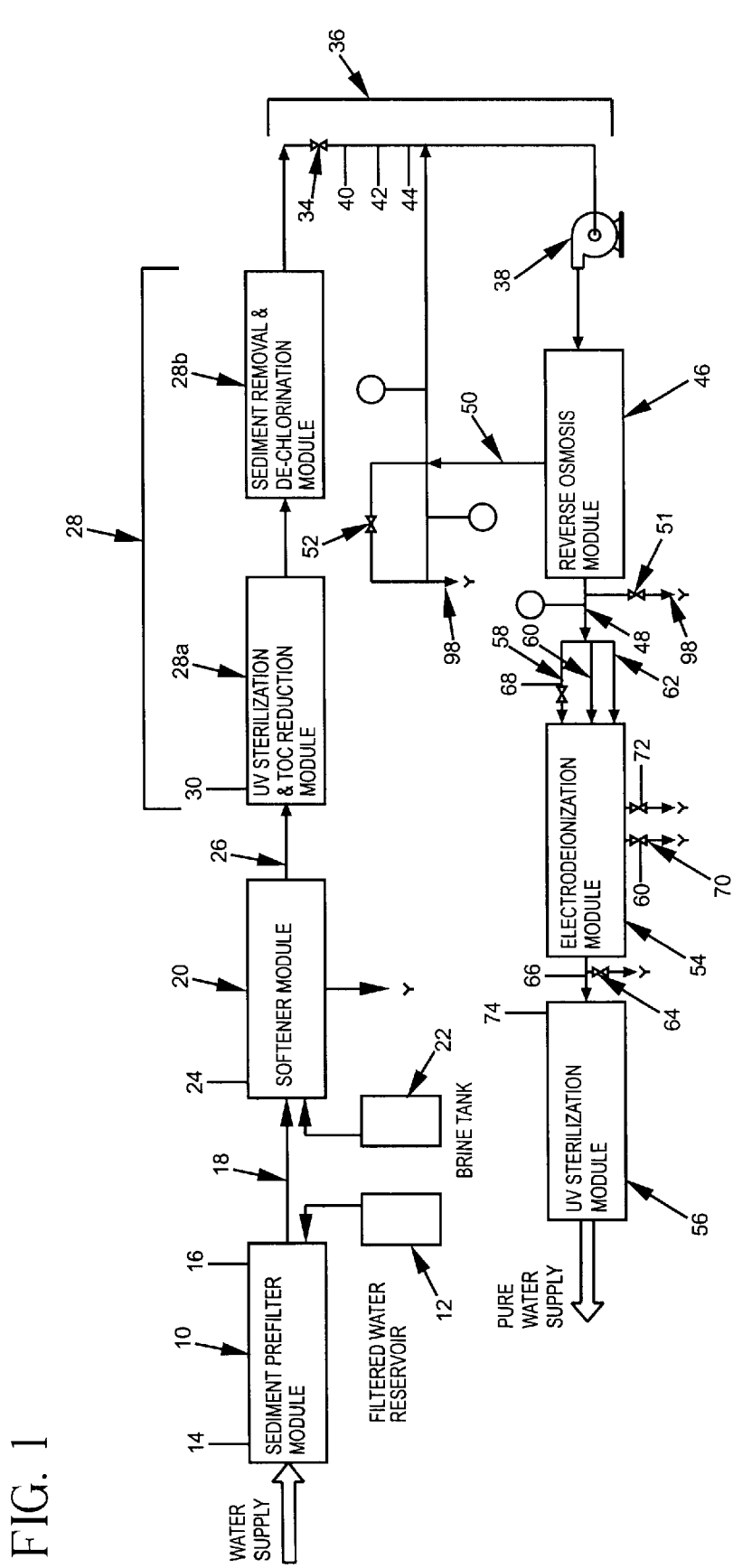
FIG. 1 is a flow diagram of the water purification process in a water purifier in accordance with the invention.

Referring to the accompanying drawings wherein like reference numerals refer to the same or similar elements, the water purification process will first be described with reference to FIG. 1.

As an initial step, supply water, i.e., the water to be purified, is directed into and through a series of pre-treatment or pre-conditioning modules designed to condition the supply water prior to primary and secondary processing operations.

The first pre-treatment module is a sediment pre-filter module 10. Sediment pre-filter module 10 includes tubular ceramic elements with a specific pore size (filter rating) designed to trap particles on the surface of the ceramic elements and enable the removal of the suspended particles from the surface of the ceramic elements. It has been found that an effective pore size of 10 microns is particularly useful for optimum practice of the invention but the invention is not limited to ceramic elements having such a pore size.

In a proposed commercial embodiment, the sediment pre-filter module 10 includes stainless steel or polypropylene tubular element housings and the ceramic elements are placed in the housings and have a diameter substantially equal to the diameter of the tubular element housings. For example, the tubular element housings and ceramic elements may both have a diameter of about 2½". The tubular element housings are arranged such that the supply water flows from the exterior of the module 10 through the tubular element housings, and thus into contact with the ceramic element(s) therein, and into the interior of the module 10.

The sediment pre-filter module 10 incorporates an automated cleaning (backwash) feature to flush the ceramic elements in order to remove accumulated particles from the surfaces of the ceramic elements. Flushing of the ceramic elements is performed at predetermined intervals, either selected by the user or programmed by the manufacturer or user, and entails the passage of a flow of a high velocity water stream from a pure water reservoir 12 in a direction opposite to the direction of the flow of supply water through the tubular element housings. Flushing of the ceramic elements is shown in the operating sequence in FIGS. 4–11 with reference to, e.g., elements 126–130 (the sediment pre-filter module being "module 1" in FIGS. 4–11). Other systems for flushing ceramic elements known to those skilled in the art could also be used in conjunction with the sediment pre-filter module 10.

The sediment pre-filter module 10 also incorporates pressure sensors 14,16 for measuring the pressure of the water at the inlet and outlet ends of the module 10, respectively. The pressure readings are directed to a control system which determines the frequency at which the module should be cleaned as well as considers whether the pressure readings are indicative of a problem with the water purification process. In the latter case, the pressure readings might reveal that there is an inadequate amount of supply water for proper operation of the water purifier. As such, a control valve situated after the pre-treatment modules could be closed to prevent flow of water to components downstream, such as a pump, which would be detrimentally affected by inadequate water flow.

Sediment pre-filter module 10 is an optional module and is not required to enable practice of the invention, although it is present in a preferred embodiment. If a sediment pre-filter module is not used, then the supply water should be filtered to 10-microns and be free of suspended solids and materials, which might precipitate on concentration. Further, ideally, the feed water should be chlorinated continuously at no less than 0.2 ppm free chlorine or the water purifier flushed with biocide periodically.

After particles are removed from the supply water in the sediment pre-filter module 10, the water is directed through a conduit 18 to a softener module 20. Softener module 20 "softens" the water by removing hard minerals such as calcium and magnesium. In the event that the sediment pre-filter module 10 is not present, then the feed water would pass directly into the softener module 20.

In a proposed commercial embodiment, softener module 20 utilizes sodium form ion exchange resins to remove calcium and magnesium ions (hereinafter referred to as hardness ions) from the supply water. The ion exchange resins are stored in one or more vertically oriented fiberglass or epoxy-coated steel tanks. The supply water is directed into each tank at its top and flows to the bottom of the tank by gravitational force while an exchange of hardness ions for sodium ions on the resins occurs.

Other means for removing hard minerals from the supply water known to those skilled in the art could also be used in the invention instead of or in addition to the softener module 20 described above.

Once the sodium ions in the tank(s) are exhausted, the resins must be regenerated. One manner to regenerate the sodium ions is to inject a brine solution from a brine reservoir 22 into the resin tank(s), although other ways to regenerate the sodium ions known to those skilled in the art can also be used in the invention.

A flow monitor 24 is associated with the softener module 20 to measure the flow rate of supply water into the softener module 20. The flow monitor 24 provides the measured flow rate of supply water into the softener module 20 to the control system. Based thereon, the control system is able to determine the processing capacity of the softener module 20 (using a localized hardness concentration value input by the operator) and totals the processed volume and compares the processed volume to the calculated volumetric capacity of the resins in the tank.

The hardness concentration value is preferably adjusted to reflect the current operating conditions since it often changes in light of seasonal variations in the supply water. An inaccurate hardness concentration value would result in non-optimal operation of the water purifier and may in fact actually damage the water purifier. Further, the free chlorine levels often vary seasonally along with the hardness concentration value and the machine should be adjusted accordingly. The free chlorine level and hardness concentration value of the supply water are thus periodically measured and entered into the control system of the water purifier so that the control system can take into account variations in these parameters and adjust the operation of the water purifier accordingly.

When the total flow into the softener module 20 is greater than the volumetric capacity of the tank(s) thereof, regeneration is initiated (automatically). This can take the form of enabling of a regeneration bit, as described below in the operating sequence (with reference to elements 156–162 and 238–244, the softener module 20 being "module 2"). A flag will be created in the control software or a register thereof, which may result in a notification to the operator on the control panel that regeneration is necessary, and when it is possible to perform the regeneration procedure, the control system can automatically initiate its performance.

Thus, the control system automatically determines when regeneration of the resins is required and is coupled to the brine reservoir 22 and associated injection pump (not shown) to cause injection of brine into the resin tank(s) in the softener module 20. To this end, the brine reservoir 22 should be continually maintained with a sufficient amount of salt.

From the softener module 20, water is directed through a conduit 26 to a de-chlorination module 28. De-chlorination module 28 involves the application of two pre-treatment processes, an ultraviolet sterilization and total organic carbon (TOC) reduction stage 28a and a sediment removal and de-chlorination stage 28b. The ultraviolet sterilization and TOC reduction stage 28a is optional and not required in the practice of the invention, although it is present in a preferred embodiment.

For the sediment removal and de-chlorination stage 28b, stainless steel or polypropylene tubular housings are provided and solid block, activated carbon elements are situated in the tubular housings. The carbon elements preferably have the same diameter as the tubular housings, e.g., 2½", and are tubular, solid and acid washed. When the water passes through the carbon elements, oxidizing (chlorine) compounds are removed. In addition, organic compounds are removed. The carbon elements are preferably encased in a polypropylene membrane which prevents sediments (including carbon fragments) from migrating downstream of the elements.

The carbon elements are in the form of a replaceable cartridge, as is known in the art, in order to enable replacement once the effectiveness of the carbon elements has been rendered null.

For the optional ultraviolet sterilization portion of stage 28a, ultraviolet lamps (254 nm wavelength) are suspended down through the center of the tubular housings to reduce microbial growth, which may occur on the interior carbon surfaces. The lamps are placed in the housings and surround by the membrane containing the carbon.

The de-chlorination module 28 includes a flow monitor 30 at an inlet end that measures the flow rate of supply water into the de-chlorination module 28. The flow monitor 30 provides the measured flow rate of supply water into the de-chlorination module 28 to the control system. Based thereon, the control system is able to automatically calculate the processing capacity of the carbon elements (using a localized oxidizing concentration value input by the operator) and alerts the operator when replacement of the carbon elements is required. This is determined by totaling the volume of water processed by the de-chlorination module 28, and comparing the processed volume to the calculated volumetric capacity of the carbon elements. The replacement function is described in the flow chart of FIGS. 4–11 with reference to elements 164–170.

Replacement of the carbon elements, i.e., the cartridge, can also be determined when the pressure drop increases by 8–10 psid over the pressure differential of a clean cartridge. The pressure differential can be determined by arranging pressure monitors before and after the carbon elements (e.g., monitors 30, 30a), connecting the pressure monitors to the control system and programming the control system to calculate the pressure differential and compare it to a predetermined pressure differential of a clean cartridge. The water purifier is thus designed to allow access to the carbon elements and to enable replacement of the carbon elements.

The water flowing from the de-chlorination module 28 has completed the pre-treatment or pre-conditioning stages and is now ready for the primary purification stage. Such water is now referred to as feed water.

The feed water flows from the de-chlorination module 28 through a conduit 32 having an inlet control valve 34 arranged in connection therewith. Control valve 34 is controlled by the control system and is usually opened when the water purifier is turned on allowing feed water to flow to a pressurization pump module 36 including a pump 38. When the water purifier is turned off (or the flow of water into the water purifier as measured by flow monitor 14 is less than a required minimum), the control valve 34 closes thereby preventing the flow of feed water through the remainder of the water purifier, and more specifically through the pump 38 which is susceptible to damage in the presence of an insufficient water flow.

In a proposed commercial embodiment, pump 38 is a multi-stage, stainless steel centrifugal design and generates the high pressures (200–600 PSIG) required for proper operation of the water purifier. Other pumps can also be used in the invention without deviating from the scope and spirit thereof.

The pump module 36 also includes a feed water quality monitor 40 that continuously measures the ionic concentration in the feed water and provides the concentration value to the control system. The pump module 36 also includes temperature monitors 42 and pressure monitors 44 that provide measured values to the control system. Monitors 40,42,44 are shown associated with the conduit 32 in that portion between the control valve 34 and the pump 38. Monitors 40,42,44 can be located at other locations such as after the pump 38.

The control system monitors these parameters and alerts the user when any value falls outside of the correct machine operating requirements. The control system also monitors the operating hours for the pump 36 and notifies the user when periodic maintenance of the pump is required or when the pump has malfunctioned.

The high-pressure pump 38 provides a pressurized water supply to a reverse osmosis module 46 including one or more element housings containing semi-permeable reverse osmosis membranes configured in series or parallel, depending upon the design flow rates for the water purifier. In each element housing, purified water is collected within a central tube (permeate tube). The semi-permeable reverse osmosis membranes, under sufficient effective pressure, allow passage of purified water while rejecting and concentrating dissolved and suspended solids. The feed water is thus separated by the membranes and leaves the module 46 in two streams, as purified water supply (RO permeate) through a conduit 48 and concentrated wastewater (RO concentrate) through a conduit 50.

The RO permeate from each membrane is collected in a central manifold, where a check valve prevents reverse flow into the membranes, and from the central manifold, the RO permeate is directed into an inlet of the secondary processing module, discussed below.

The RO concentrate leaving each housing, is collected in a concentrate manifold and flows to a concentrate header assembly. This concentrated water is divided into a recycle stream and a waste stream. The recycle stream is directed back through a conduit 41 to the inlet of the primary processing module where it is blended with the feed water, i.e., into conduit 32 in that portion between the control valve 34 and the pump 38. This allows higher machine recovery while maintaining adequate cross flow through the membranes.

Flow monitor 43 is associated with conduit 41 and measures the flow of the recycle stream. Flow monitor 45 is associated with the waste stream and measures the flow of the waste stream.

The waste stream is directed to a central wastewater manifold used for collection of all waste streams from the water purifier. The wastewater manifold directs all waste flows to the local waste system. Incorporated in the waste stream manifold is a control valve 52 coupled to the control system. Control valve 52 is periodically opened at predetermined intervals to allow a high velocity flow of water to purge the membrane surfaces and prevent bacteria growth within the reverse osmosis module 46.

The reverse osmosis module 46 includes flow and pressure monitors in each process stream that measure the flow and pressure of the fluid and provide the measured flow rate per minute of processing time and instantaneous process pressures to the control system. Flow monitor 47 is associated with conduit 48 and measures the flow of the RO permeate. Further, a control valve 51 is associated with conduit 48 to enable the removal or draining of the RO permeate. The measurements provided by flow monitors 43,45 provide the total flow of the RO concentrate.

The control system calculates the optimum required flow rates and pressures for each process stream and adjusts control valves 51,52 to achieve these parameters. The control system also monitors each process parameter and notifies or alerts the user when any value falls outside of the correct machine operating requirements. For example, the control system monitors the operation of the reverse osmosis module 46 and alerts the user when periodic maintenance or cleaning of the module is required.

The reverse osmosis module 46 is the primary processing unit in the illustrated embodiment of the invention. From the reverse osmosis module 46, the purified water is directed to a secondary processing stage.

The first component in the secondary processing stage is an electrodeionization (EDI) module 54. The purified water from the reverse osmosis module 46, i.e., the RO permeate collected in the central manifold, is separated into three distinct processing streams prior to entering the electrodeionization module 54: a product stream in conduit 58 (which is destined to be purified by the EDI module 54, then directed to an outlet post-treatment module); a concentrate stream 60 and an electrode stream 62.

The EDI module 54 uses hydrogen form cation and hydroxide form anion ion exchange resins, ion selective membranes and electricity to remove remaining ions in the pure water stream. Pure water processed through the EDI module 54 is directed through a conduit 64 to a post-treatment sterilization module 56.

Figure 2:
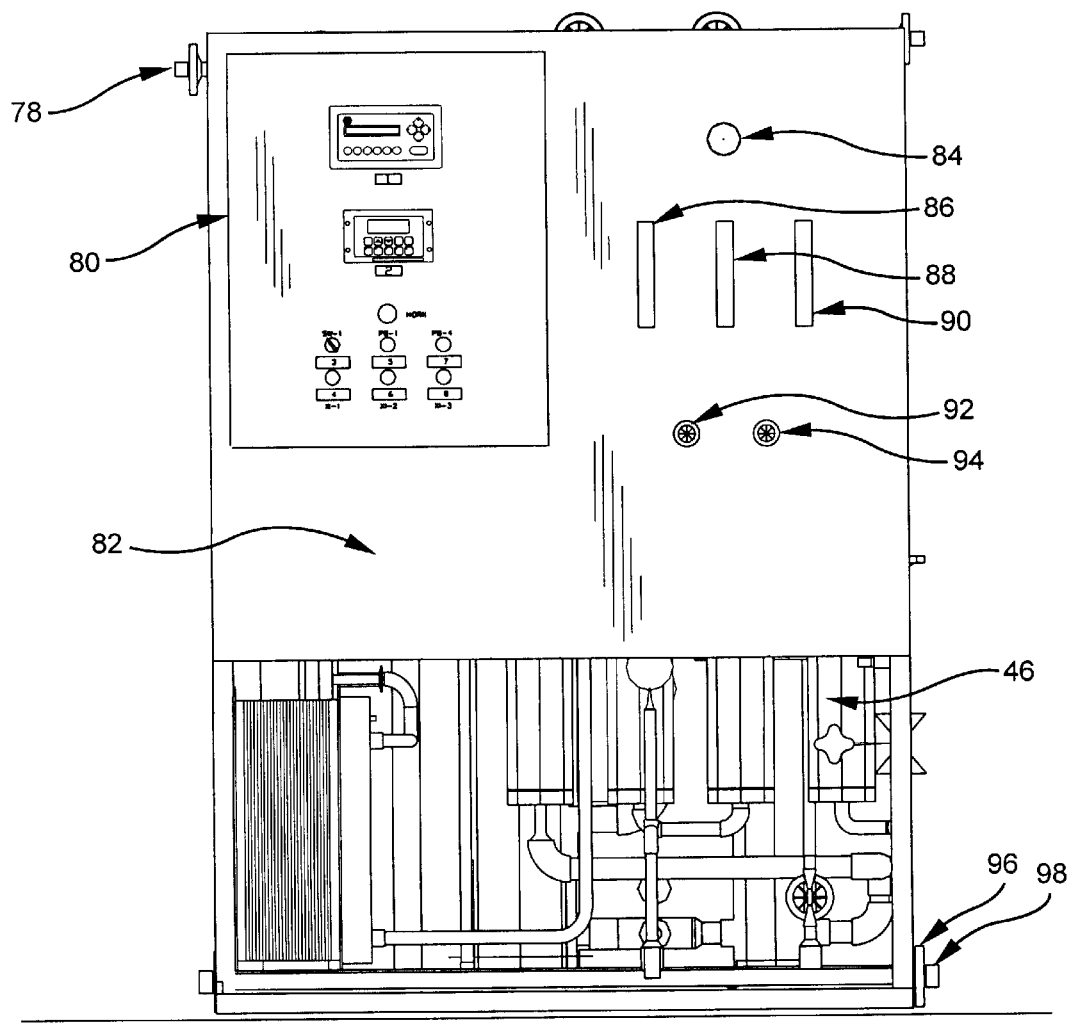
FIG. 2 is a front view of one embodiment of a water purifier in accordance with the invention.
Figure 2A:
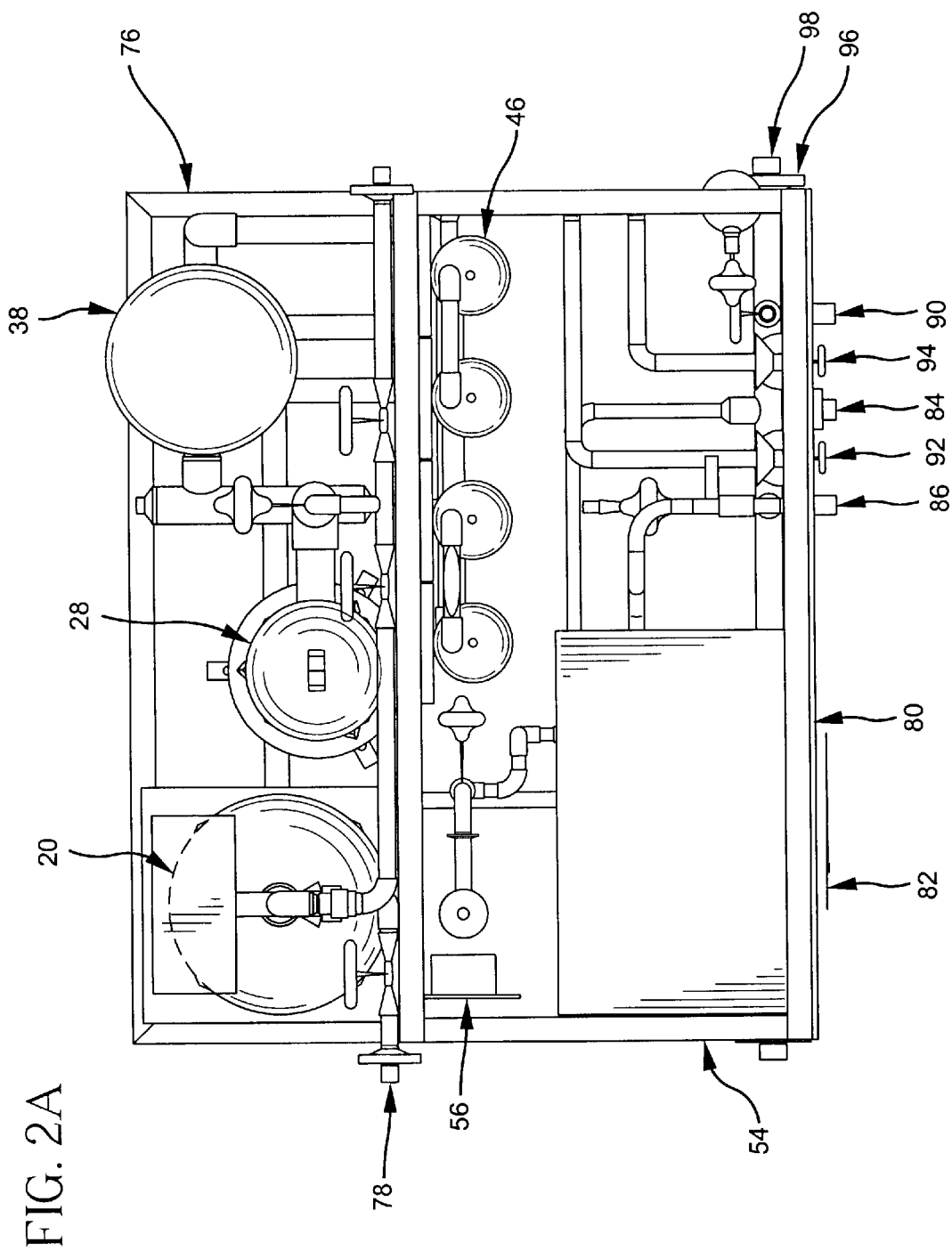
FIG. 2A is a top view of the embodiment of the water purifier shown in FIG. 2.

The concentrate and electrode streams are directed through the EDI module 54 and then to the central wastewater manifold or a unit drain connection 96 (see FIGS. 2 and 2A). The EDI module 54 includes a pure water quality monitor 66 that continuously measures the ionic concentration in the outlet pure water and provides the concentration value to the control system. The control system calculates the required electrical voltage and current required by the EDI module 54 and automatically adjusts each to achieve optimum outlet water quality.

The EDI module 54 also includes flow monitors 68,70,72 for each process stream (the product stream, concentrate stream and electrode stream, respectively) that measure the flow rate of the associated stream and provide the measured flow rate per minute of processing time and instantaneous process pressures to the control system. Based thereon, the control system calculates the optimum required flow rates for each process stream and adjusts unit control valves 69,71,73 to achieve these parameters, if such adjustment is necessary. The control system also monitors each process parameter and notifies or alerts the user when any value falls outside of the correct machine operating requirements.

Instead of or in addition to providing independent flow monitors 70,72 for the concentrate stream 60 and the electrode stream 62, it is also possible to provide flow orifices.

The control system also monitors the operation of the EDI module 54 and notifies or alerts the user when periodic maintenance or cleaning of the module is required.

Product (pure) water leaving the EDI module 54 passes through a final post-treatment conditioning module 56 designed to insure product water quality prior leaving the unit. The post-treatment conditioning module is in the illustrated embodiment, a UV sterilization module 56 which uses 254 nm wavelength ultraviolet lamps to effectively destroy (sterilize) any residual organisms (bacteria) that may be present in the pure water steam exiting the EDI module 54. The intensity of the ultraviolet light provided by the lamps is measure by a measurement device 74, which is connected to the control system so that the control system continually monitors the intensity of the ultraviolet light and notifies or alerts the operator when replacement of the lamps is required. Purified water is thus obtained at the outlet of the sterilization module 56.

The UV sterilization module 56 is an optional feature and is not required for the practice of the invention.

The modules, pumps, valves and monitors described above are preferably arranged in a frame with access to certain replaceable components easily provided, e.g., the carbon elements of the de-chlorination module. The compact design of the water purifier thereby provides several significant advantages most notably the need for minimal floor space. The water purifier is a compact self-contained unit requiring only a connection to an inlet water supply and the input of several operating parameters in order to commence operation.

The various monitors described above generally are designed to provide a signal to the control system relating to the physical quantity the monitor is designed to measure. For example, a flow monitor would provide a signal whenever a specific volume of water is measured. Thus, the control system can determined the total amount of water based on the number of signals received.

With respect to the control system, the control system is a novel in that it integrates and controls the operation of each process module in the invention in order to achieve optimum overall performance. The operation of the modules is coordinated by the control system to provide for optimum overall performance.

The control system uses a central microprocessor and operator interface device to integrate and control the operation of each module. The central program controls each vital operating parameter of the water purifier as described above, continually monitoring the performance of individual modules and adjusting the module if necessary to achieve overall optimum unit performance. The control program thus monitors the operation of each module by receiving and processing data from monitors associated with each module and notifies or alerts the operator when component maintenance or operational repairs are required.

For example, an alarm, or other oral and/or visual indicator designed to attract the attention of the operator, will be activated in the event of high inlet water temperature, low inlet pressure, high permeate pressure, pressure pump failure and poor outlet water quality. If any alarm condition exists and shuts down the water purifier, the water purifier can only be re-started by first pushing an alarm reset button and then reinitializing the operating status of the water purifier.

The water purifier uses the computer operator interface (a control panel discussed below) to display operational parameters of the machine, to indicate alarms and to indicate required external operator maintenance, and allows customization of operational parameters and constraints used by the control system to calculate required operational performance conditions.

Exemplifying operational functions that the microprocessor controls include:

1. Unit operational sequences including preflush, purge and production.
2. Unit production performance including individual component production performance.
3. Unit operational parameters including temperature, inlet/outlet pressures, product flow, waste flow, inlet/outlet quality.
4. Individual component maintenance requirements.
5. Unit alarms including loss of utility services (feed water, compressed air, electricity) and unit malfunction.

FIG. 2 is a front view of an exemplifying commercial embodiment of a water purifier in accordance with the invention and FIG. 2A is a top view thereof. The water purifier is contained entirely within a frame or outer housing 76. An inlet connection 78 for the water supply is arranged on the housing 76. A control panel 80 is arranged on a front panel 82 of the housing 76. Control panel 80 includes a display screen (LED, LCD and the like) and input buttons or function keys.

System indicators are also arranged on the front panel 82 and include a system pressure indicator 84, a permeate flow rate indicator 86, an EDI concentrate flow rate indicator 88 and a RO concentrate flow rate indicator 90.

The permeate flow indicator 86 displays an indication of the flow of RO permeate obtained from the flow monitor 47 associated with the RO permeate stream. The EDI concentrate flow rate indicator 88 displays an indication of the flow of EDI concentrate obtained from the flow monitor 70. The RO concentrate flow rate indicator 90 displays an indication of the flow of RO concentrate obtained from the flow monitors 43,45.

An RO recycle valve 92 and an RO concentrate valve 94 are also arranged in connection with the front panel 82. These valves enable manual adjustment of the recycle stream from the reverse osmosis module 54 and the concentrate stream from the reverse osmosis module 54, respectively.

The water purifier is designed to operate at a specified pressure. To ensure proper and optimal operation of the water purifier, the RO recycle valve 92 and RO concentrate valve 94 might require adjustment such that the proper recovery is set (the ratio of permeate flow to the feed water flow). The flow rates are shown on the indicators 88,90. For example, a 75% recovery system will have 25% of feed water as concentrate. If the concentrate rate is higher or lower as seen by the indicators 88,90, manual adjustment of the RO recycle valve 92 and/or RO concentrate valve 94 will bring the recovery rate to the designed rate at which the system will perform optimally.

It can be seen from FIGS. 2 and 2A that the reverse osmosis module 54 include four element housings which are arranged in series so that feed water passes through all four element housings. The number and size of the element housings is variable so that if a smaller number of element housings were desired to be used, the element housings might be designed to be larger to enable the same flow rate of water to be processed.

FIGS. 2 and 2A also show a drain 96 from the EDI module 54, from both the concentrate and electrode streams, or a manifold in which the two streams are combined, and another drain 98 from a central wastewater manifold.

Figure 3:
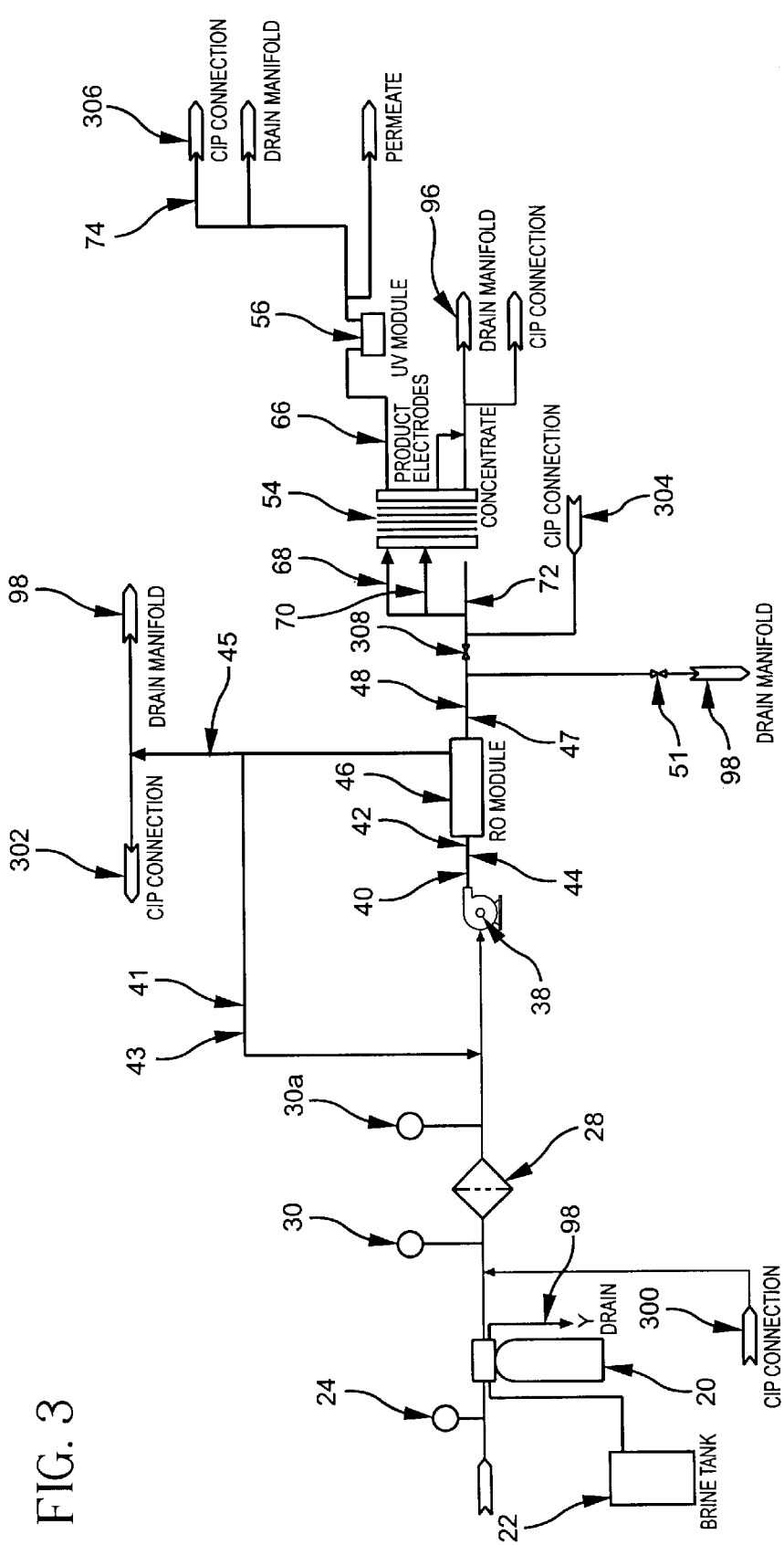
FIG. 3 is a schematic of a water purifier in accordance with the invention.
Figure 4:
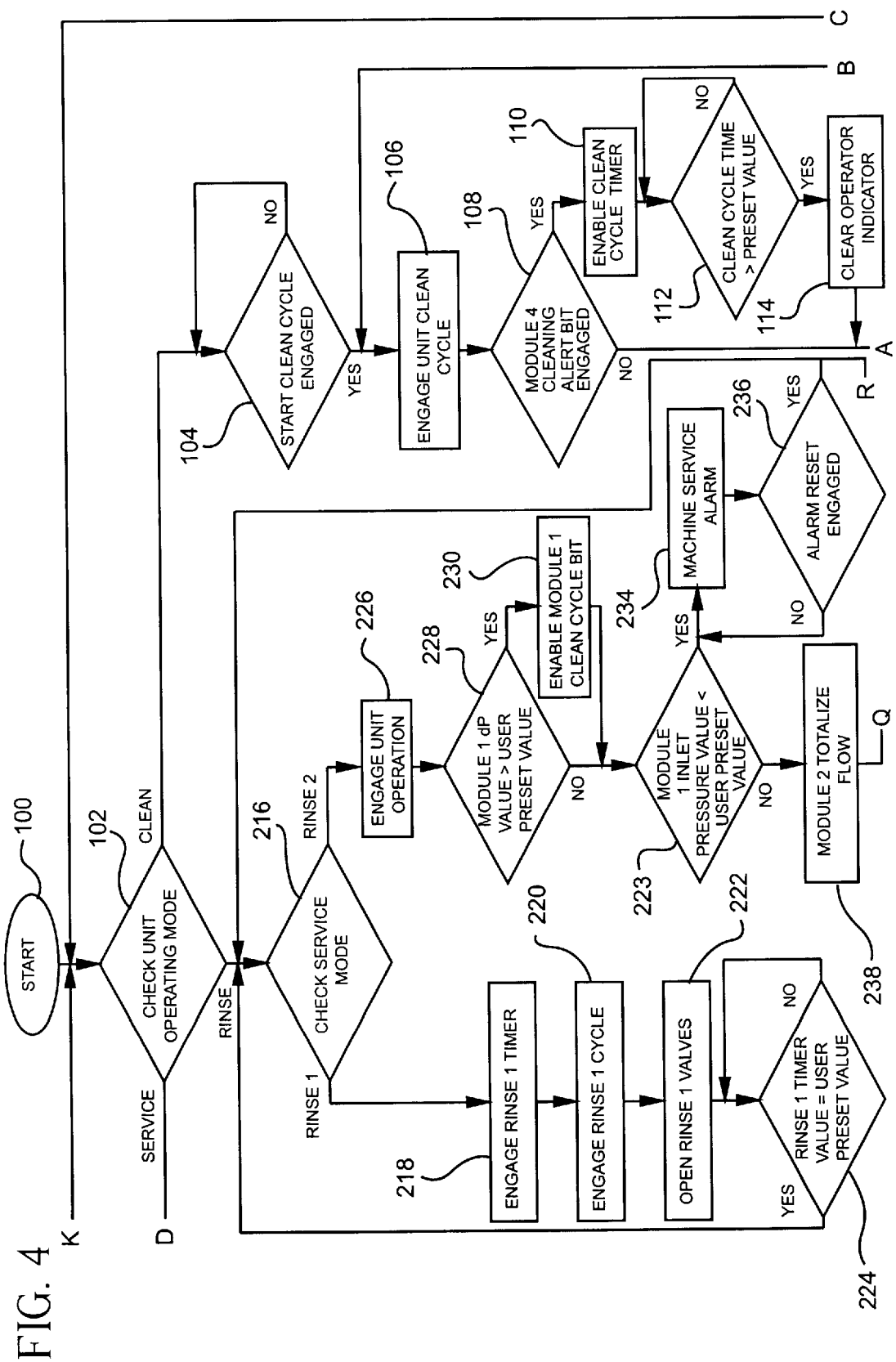
FIGS. 4–11 are flow charts of the operation of a water purifier in accordance with the invention.

FIG. 3 shows another schematic diagram of the water purification process in accordance with the invention. Included in FIG. 3 are several valves denoted CIP or CIP connection valves. These valves are used to clean and/or flush the different components of the water purifier.

The reverse osmosis module 46 and the EDI module 54 are cleaned separately, or in some situations can even be cleaned together. To clean the reverse osmosis module, a CIP valve 300 is opened while the supply water inlet valve is closed. Water during the cleaning cycle is directed through the system to the CIP outlet valve 302. Valve 308 is closed to prevent water passing through to the EDI module 54.

The EDI module 54 is cleaned by opening a CIP valve 304. Water is directed through the EDI module 54 to a CIP outlet valve 306.

Referring now to FIGS. 4–11, a flow chart of the operating sequence of a water purifier in accordance with the invention will now be described.

The operation of the water purifier starts at circle 100 and proceeds to a determination of the operating mode of the unit at 102. For the following discussion and in FIGS. 4–11, the water purifier is referred to as the unit.

The unit has three operating modes, service (in which water is purified), clean (in which the unit is cleaned) and rinse (in which the unit is rinsed).

In the clean mode, operation proceeds to a determination as to whether an indicator for the start of the clean cycle is engaged at 104. If not, the sequence waits until such time as the indicator for the start of the clean cycle is engaged. Once the indicator for the start of the clean cycle is engaged, the clean cycle commences at 106. Engagement of the indicator for the start of the clean cycle can be performed by entering appropriate commands via the control panel 80.

The operation proceeds to a determination whether module 4 cleaning alert bit is engaged at 108. Module 4 is the reverse osmosis module. Engagement of the cleaning alert can be performed automatically by the water purifier when certain operating parameters are not satisfied. These operating parameters can be set based on the measured flow and pressure of the RO concentrate stream and RO process stream by monitors 43,45,47.

If the module 4 cleaning alert bit is not engaged, a clean cycle timer is engaged at 110. A determination is then made at 112 if the clean cycle time is greater than a preset value which is the pre-set time for the duration of the clean cycle. If not, the clean cycle continues. Once the clean cycle time is greater than the pre-set value, the operator indicator is cleared at 114. A determination is made whether the clean cycle is engaged at 116 (see FIG. 5). If so, the clean cycle commences again at 106. If not, the operating mode of the unit is again checked at 102 to determine whether the operating mode of the unit is service, rinse or clean.

If module 4 cleaning alert bit is not engaged, then a determination is made whether the clean cycle is engaged at 116. If so, the clean cycle commences at 106. If not, the operating mode of the unit is again checked at 102 to determine whether the operating mode of the unit is service, rinse or clean.

Figure 6:
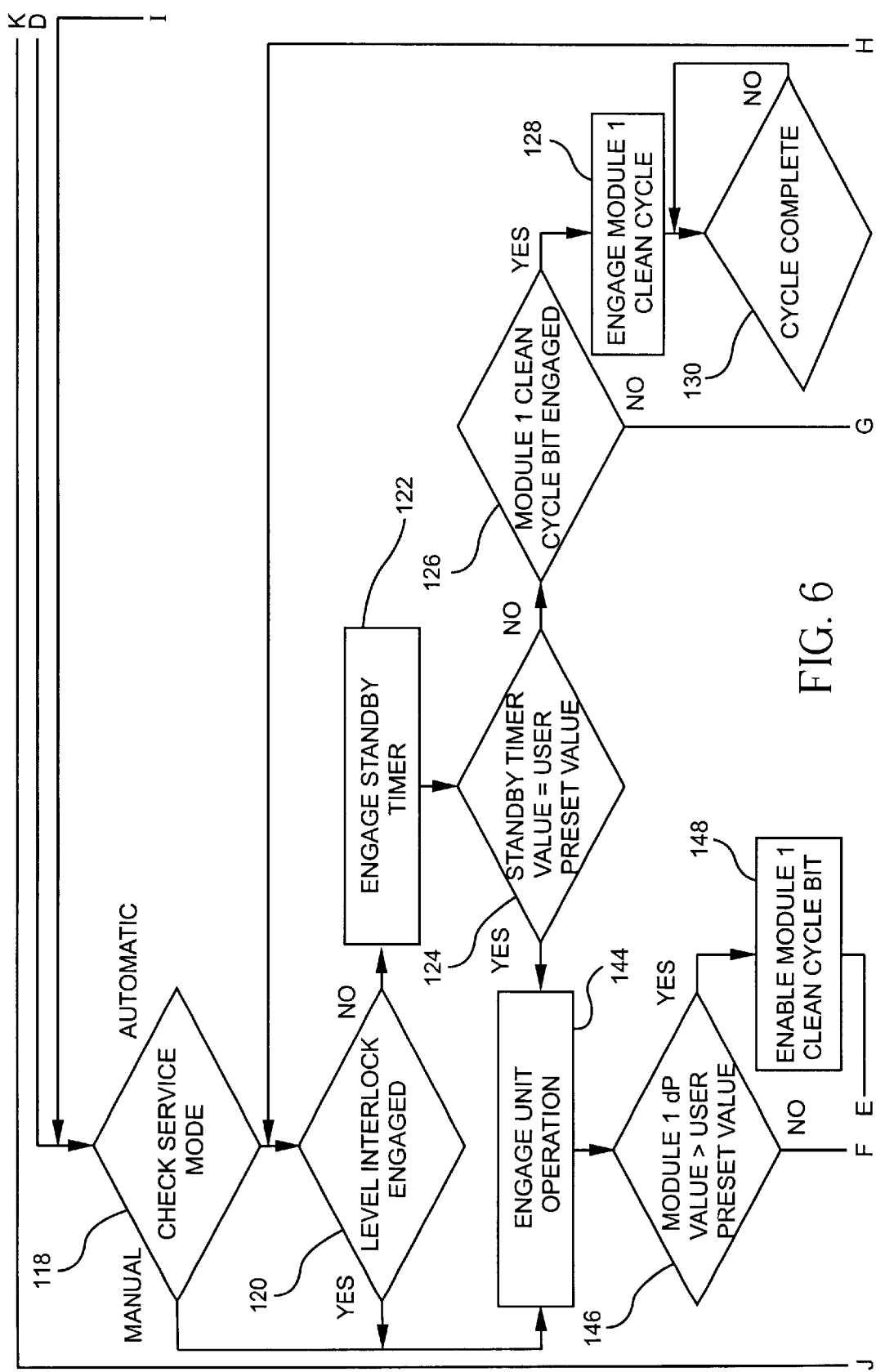

In the service mode, a determination is made whether the unit is in a manual service mode or an automatic service mode at 118 (see FIG. 6). Placement of the unit in the manual or automatic service mode is performed via the control panel 80. If the unit is in the automatic service mode, a determination is made whether the level interlock is engaged at 120. If so, the unit proceed as if it is in the manual service mode. If not, the automatic service mode continues by engaging a standby timer at 122. A determination is then made whether the value of the standby timer is equal to a value preset by the user at 124.

If the standby timer value does not equal the user preset value, then a determination is made whether the module 1 clean cycle bit is engaged at 126. Module 1 is the sediment pre-filter module 10. If so, the module 1 clean cycle is engaged at 128, a determination is then made periodically whether the cycle is complete at 130 and once the cycle is complete, a determination is made whether the module 2 regeneration bit is engaged at 132 (see FIG. 7). Module 2 is the softener module 20 and engagement of the regeneration bit may be accomplished automatically when the calculated volumetric flow into the softener module 20 exceeds the volumetric capacity of the tank. If in this case, regeneration of the softener module 20 is required and the regeneration cycle is commenced at 134 and a determination is periodically made as to whether the cycle is complete at 136. The module 2 regeneration is the regeneration of the sodium ions in the tank(s) of the softener module 20 which is achieved by directing brine from the brine reservoir into the softener module 20.

Once the regeneration cycle is complete, or if the module 2 regeneration bit is not engaged, a determination is made whether the module 3 replacement bit is engaged at 138. Module 3 is the de-chlorination module 28. Engagement of the module 3 replacement bit is an indication that one or more of the elements of the de-chlorination module requires replacement, e.g., the cartridge requires replacement. Thus, when the module 3 replacement bit is engaged, an operator indicator is enabled at 140 and a determination is periodically made as to whether the cartridge has been replaced at 142.

Once it has been determined that the element or elements have been replaced, or if the module 3 replacement bit is not engaged, the operator indicator is cleared at 144 and the sequence returns to determine again whether the level interlock is engaged at 120.

Referring back to FIG. 6, when the standby timer value equals the user pre-set value, operation of the unit is engaged at 144. Unit operation is also engaged when the service mode is set to manual or when the level interlock is engaged.

Engagement of the unit operation initially entails determining whether the module 1 dP value is greater than a user pre-set value at 146. This is performed by the control system. If so, module 1 clean bit cycle is engaged at 148. The module 1 dP value is a value obtained by the difference between the outlet pressure of the water from the sediment pre-filter module 10, as obtained by pressure monitor 16, and the inlet pressure of the water into the sediment pore-filter module 10, as obtained by pressure monitor 14. If this difference is above a certain predetermined value, it would be indicative of build-up of sediments on the ceramic elements in the sediment pre-filter module 20. The user pre-set value is determined based on the maximum allowable difference in pressure which would provide adequate sediment removal without unduly impending the flow of water. Once the build-up of sediments is excessive to the point where it would interfere with the operation of the water purifier, then the clean cycle bit is engaged to cause cleaning or flushing of the ceramic elements.

Figure 7:
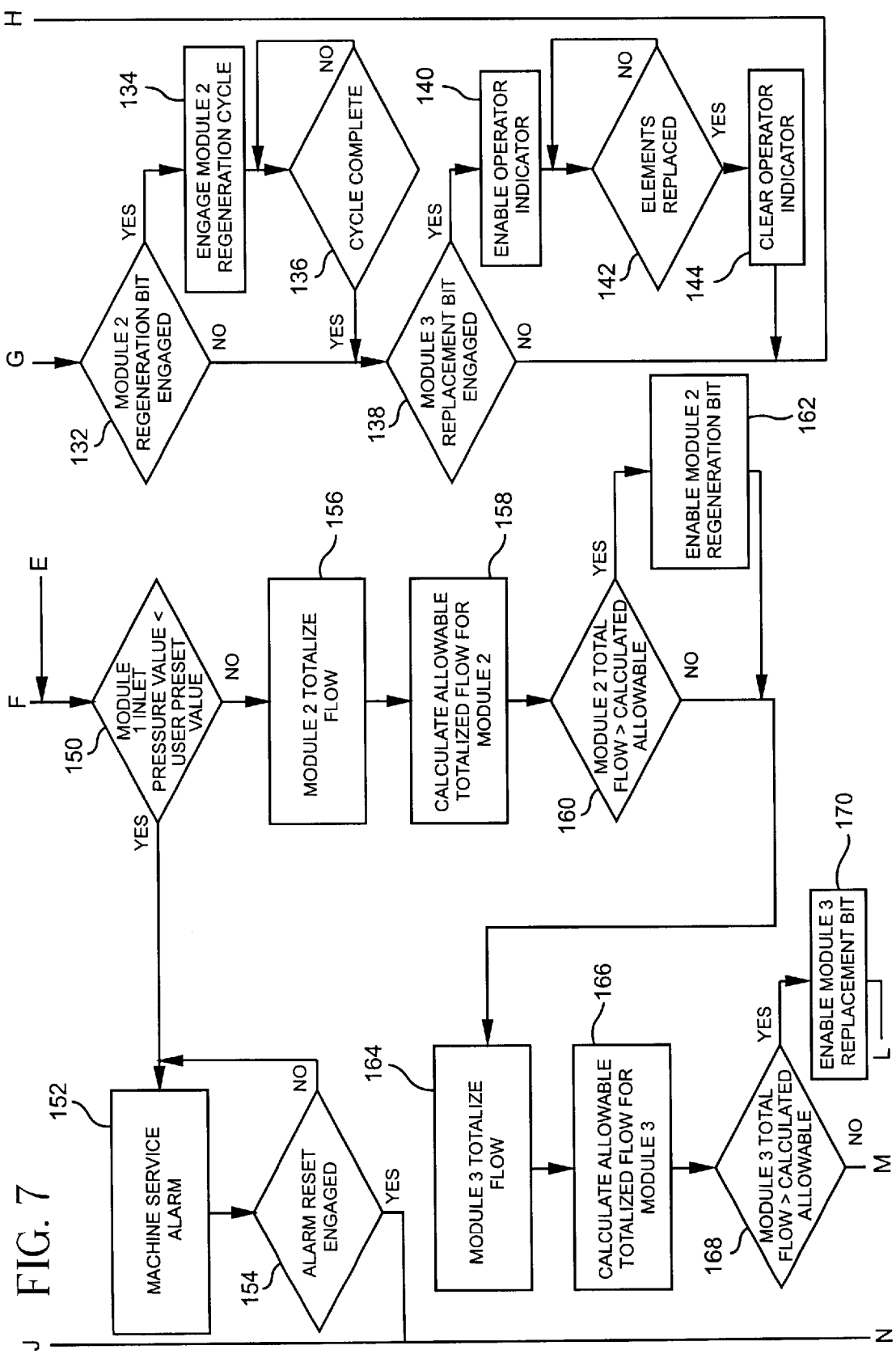

After the module 1 clean bit cycle is engaged, or if the module 1 dP value is not greater than the user pre-set value, a determination is made whether the module 1 inlet pressure value is less than a user pre-set value at 150 (see FIG. 7). The inlet pressure of module 1 (the sediment pre-filter module 10) is determined by pressure monitor 14. The control system assesses the relation between the pressure measured by monitor 14 and the user pre-set value. The user pre-set value is determined based on what the minimum possible water pressure into the sediment pre-filter module 20 is required to ensure adequate operation of the water purifier.

If so, a service alarm is sound at 152. After the alarm sounds, a determination is made whether the alarm reset is engaged at 154, i.e., a response to the alarm was effected. If not, the alarm continues to sound. Instead of an alarm, any type of warning device, oral and/or visual, can be used. After the alarm reset is engaged, the operating sequence returns to again check the unit's operating mode at 102.

If the module 1 inlet pressure value is not less than the user pre-set value, the module 2 total flow is measured at 156 and the allowable total flow for module 2 is calculated at 158. A determination is made whether the module 2 total flow is greater than the calculated allowable flow at 160 and if so, then the module 2 regeneration bit is enabled at 162. Module 2 is the softener module 20 including a tank of sodium ion resins which require regeneration after a certain volume of water is passed through the tank. Measurement of the total flow into softener module 20 is obtained by flow monitor 24.

When the module 2 total flow is not greater than the calculated allowable flow, or after the module 2 regeneration bit is enabled, the module 3 total flow is measured at 164 and the allowable total flow for module 3 is calculated at 166. Measurement of the flow into module 2 is performed by flow monitor 24 with the total flow being determined in the control system.

A determination is made whether the module 3 total flow is greater than the calculated allowable flow at 168, and if so, then the module 3 replacement bit is enabled at 170. Module 3 is the de-chlorination module 28 and the measurement of the total flow into module 3 is obtained by the flow monitor 30. Calculation of the allowable total flow for module 3 is performed in the control system as well as the relative analysis of the calculated allowable total flow to the measured total flow.

Figure 8:
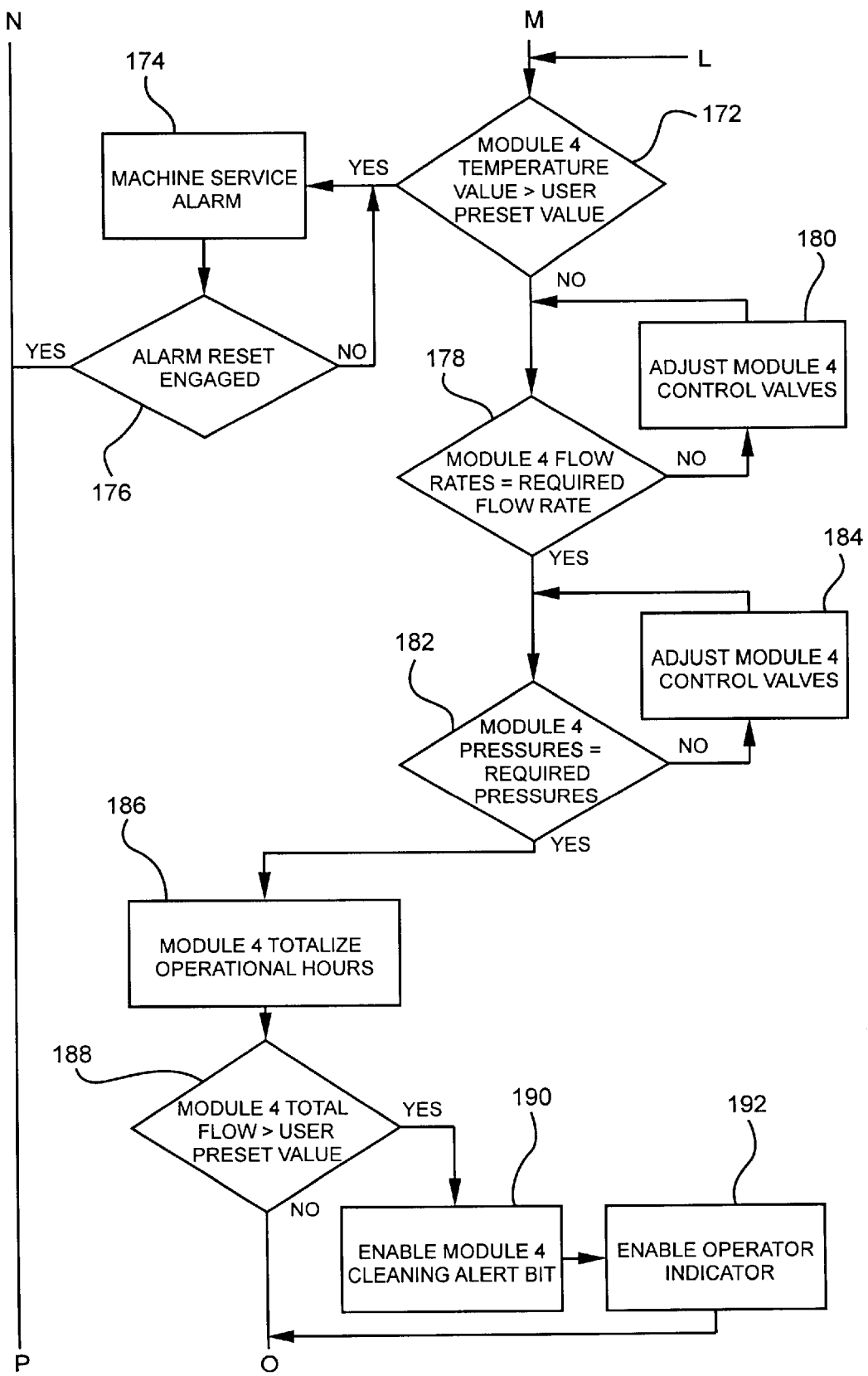

When the module 3 total flow is not greater than the calculated allowable flow, or after the module 3 replacement bit is enabled, a determination is made whether the module 4 temperature value is greater than a user pre-set value at 172 (see FIG. 8). If so, a service alarm is sound at 174. After the alarm sounds, a determination is made whether the alarm reset is engaged at 176, i.e., a response to the alarm was effected. If not, the alarm continues to sound. Instead of an alarm, any type of warning device, oral and/or visual, can be used. After the alarm reset is engaged, the operating sequence returns to again check the unit's operating mode at 102.

The module 4 temperature value is determined by temperature monitor 42 which is positioned to measure the temperature of the feed water proximate the RO module 46 in the illustrated embodiment. Temperature monitor 42 can be situated at other locations in the process.

When the module 4 temperature value is not greater than the user pre-set value, a determination is made whether the module 4 flow rates equal the required flow rates at 178. If not, the module 4 control valves are adjusted at 180, and it is again considered whether the module 4 flow rates equal the required flow rates. Thus, when needed, the module 4 control valves will be continually adjusted until the measured module 4 flow rates equal the required flow rates.

Once the module 4 flow rates equal the required flow rates, a determination is made whether module 4 pressures equal the required pressures at 182. If not, the module 4 control valves are adjusted at 184, and it is again considered whether the module 4 pressures equal the required pressures. Thus, when needed, the module 4 control valves will be continually adjusted until the measured module 4 pressures equal the required pressures.

The module 4 pressure is determined by pressure monitor 44 which is positioned to measure the pressure of the feed water proximate the RO module 46 in the illustrated embodiment. Pressure monitor 44 can be situated at other locations in the process.

Once the module 4 pressures equal the required pressures, the module 4 total operation hours is measured at 186. A determination is made whether the module 4 total flow is greater than a user pre-set value at 188 and if so, the module 4 cleaning alert bit is enabled at 190 and an operator indicator is enabled at 192.

Figure 9:
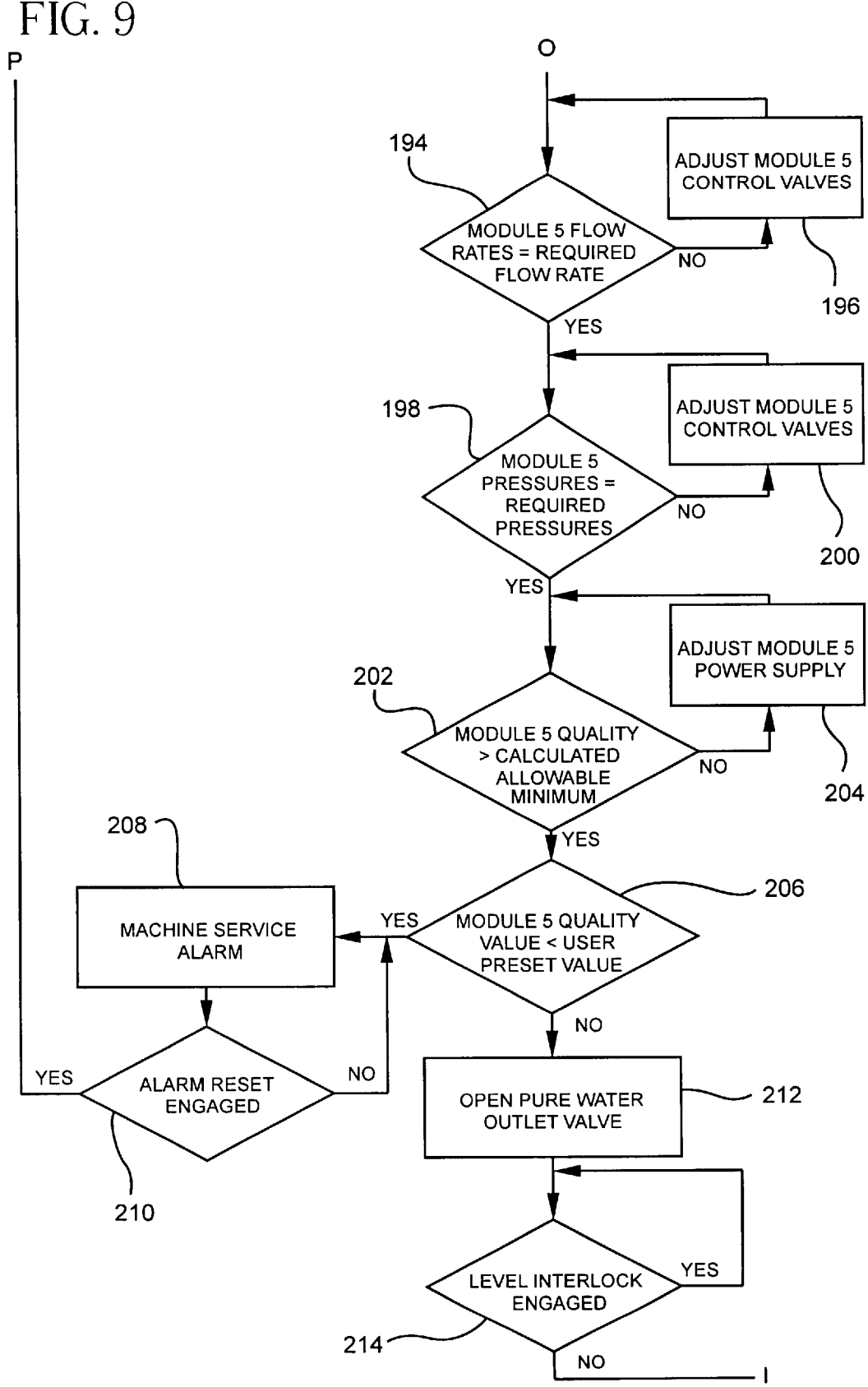

If the module 4 total flow is not greater than the user pre-set value, or after the operator indicator is enabled, a determination is made whether the module 5 flow rates equal the required flow rates at 194 (see FIG. 9). Module 5 is the EDI module 54 and the measurement of the flow rates is obtained by flow monitors 68,70,72. If not, the module 5 control valves are adjusted at 196, and it is again considered whether the module 5 flow rates equal the required flow rates. Thus, when needed, the module 5 control valves will be continually adjusted until the measured module 5 flow rates equal the required flow rates.

Once the module 5 flow rates equal the required flow rates, a determination is made whether module 5 pressures equal the required pressures at 198. If not, the module 5 control valves are adjusted at 200, and it is again considered whether the module 5 pressures equal the required pressures. Thus, when needed, the module 5 control valves will be continually adjusted until the measured module 5 pressures equal the required pressures.

To this end, flow monitors 68,70,72 can represent monitors which measure the flow of liquid in the associated stream, or monitors which measure the pressure of the liquid or monitor which measure both the flow and pressure of the liquid.

After the measured module 5 pressures equal the required pressures, a determination is made whether the module 5 quality is greater than the calculated allowable minimum at 202. The quality of the water is measured by monitor 66. If the water quality is not greater than the allowable minium quality, then the module 5 power supply is adjusted at 204 and it is again considered whether the module 5 quality is greater than the calculated allowable minium. Thus, when needed, the module 5 power supply will be continually adjusted until the module 5 quality (the quality of the feed water after passage through the EDI module 54) is greater than the calculated allowable minimum.

Once the measured module 5 quality is greater than the calculated allowable minimum, a determination is made whether the module 5 quality value is less than a user pre-set value at 206 (the user being able to set a desired quality above the allowable minimum). If so, a service alarm is sound at 208. After the alarm sounds, a determination is made whether the alarm reset is engaged at 210, i.e., a response to the alarm was effected. If not, the alarm continues to sound. Instead of an alarm, any type of warning device, oral and/or visual, can be used. After the alarm reset is engaged, the operating sequence returns to again check the unit's operating mode at 102.

If the measured module 5 quality value is not less than the user pre-set value, the pure water outlet valve is opened at 212 and provides a stream of purifier water.

A determination is continuously made whether the level interlock is engaged at 214. Once the level interlock is not engaged, the operating sequence returns to check the service mode at 118.

Referring back to FIG. 4, in the rinse mode, initially a determination is made to the service mode at 216, i.e., the unit is designed to enable multiple rinse cycles, in the exemplifying embodiment, two. If the first rinse cycle is selected, then a timer is engaged at 218, the cycle is commenced at 220 and the rinse valves are opened at 222. Periodically, a determination is made whether the timer value is equal to a user pre-set value at 224, i.e., the duration of the rinse cycle is predetermined by the user and when the timer indicates that the elapsed cycle time is equal to the predetermined time, the service mode is again checked at 216.

The second rinse cycle is a more detailed cycle and in this rinse cycle, the unit operation is engaged at 226. Engagement of the unit operation initially entails determining whether the module 1 dP value is greater than a user pre-set value at 228. If so, module 1 clean bit cycle is enabled at 230.

After the module 1 clean bit cycle is enabled, or if the module 1 dP value is not greater than the user pre-set value, a determination is made whether the module 1 inlet pressure value is less than a user pre-set value at 232. If so, a service alarm is sound at 234. After the alarm sounds, a determination is made whether the alarm reset is engaged at 236, i.e., a response to the alarm was effected. If not, the alarm continues to sound. Instead of an alarm, any type of warning device, oral and/or visual, can be used. After the alarm reset is engaged, the operating sequence returns to again check the service mode at 216.

Figure 5:
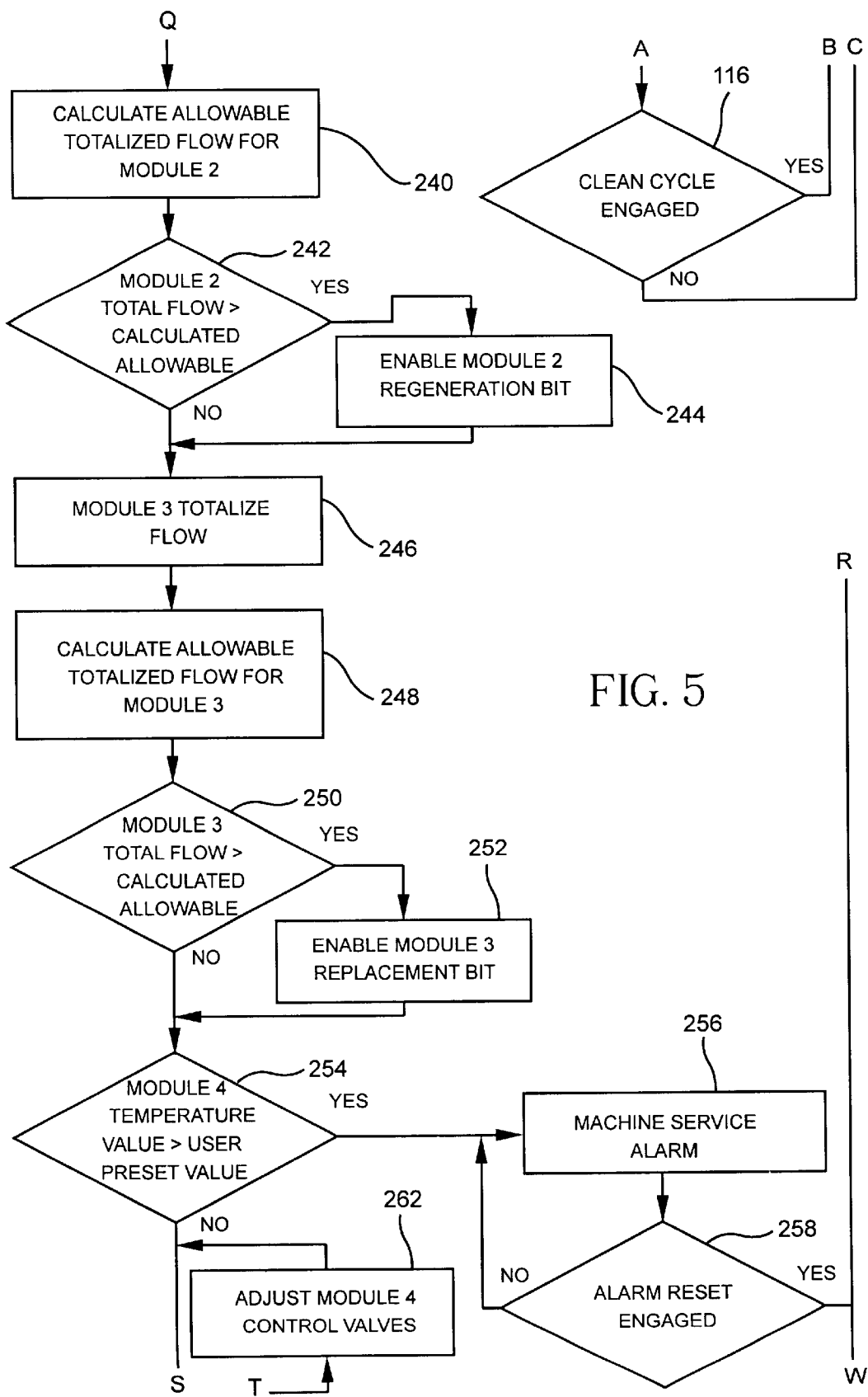

If the module 1 inlet pressure value is not less than the user pre-set value, the module 2 total flow is measured at 238 and the allowable total flow for module 2 is calculated at 240 (see FIG. 5). A determination is made whether the module 2 total flow is greater than the calculated allowable flow at 242 and if so, then the module 2 regeneration bit is enabled at 244.

When the module 2 total flow is not greater than the calculated allowable flow, or after the module 2 regeneration bit is enabled, the module 3 total flow is measured at 246 and the allowable total flow for module 3 is calculated at 248. A determination is made whether the module 3 total flow is greater than the calculated allowable flow at 250, and if so, then the module 3 replacement bit is enabled at 252.

When the module 3 total flow is not greater than the calculated allowable flow, or after the module 3 replacement bit is enabled, a determination is made whether the module 4 temperature value is greater than a user pre-set value at 254. If so, a service alarm is sound at 256. After the alarm sounds, a determination is made whether the alarm reset is engaged at 258, i.e., a response to the alarm was effected. If not, the alarm continues to sound. Instead of an alarm, any type of warning device, oral and/or visual, can be used. After the alarm reset is engaged, the operating sequence returns to again check the service mode at 216.

Figure 10:
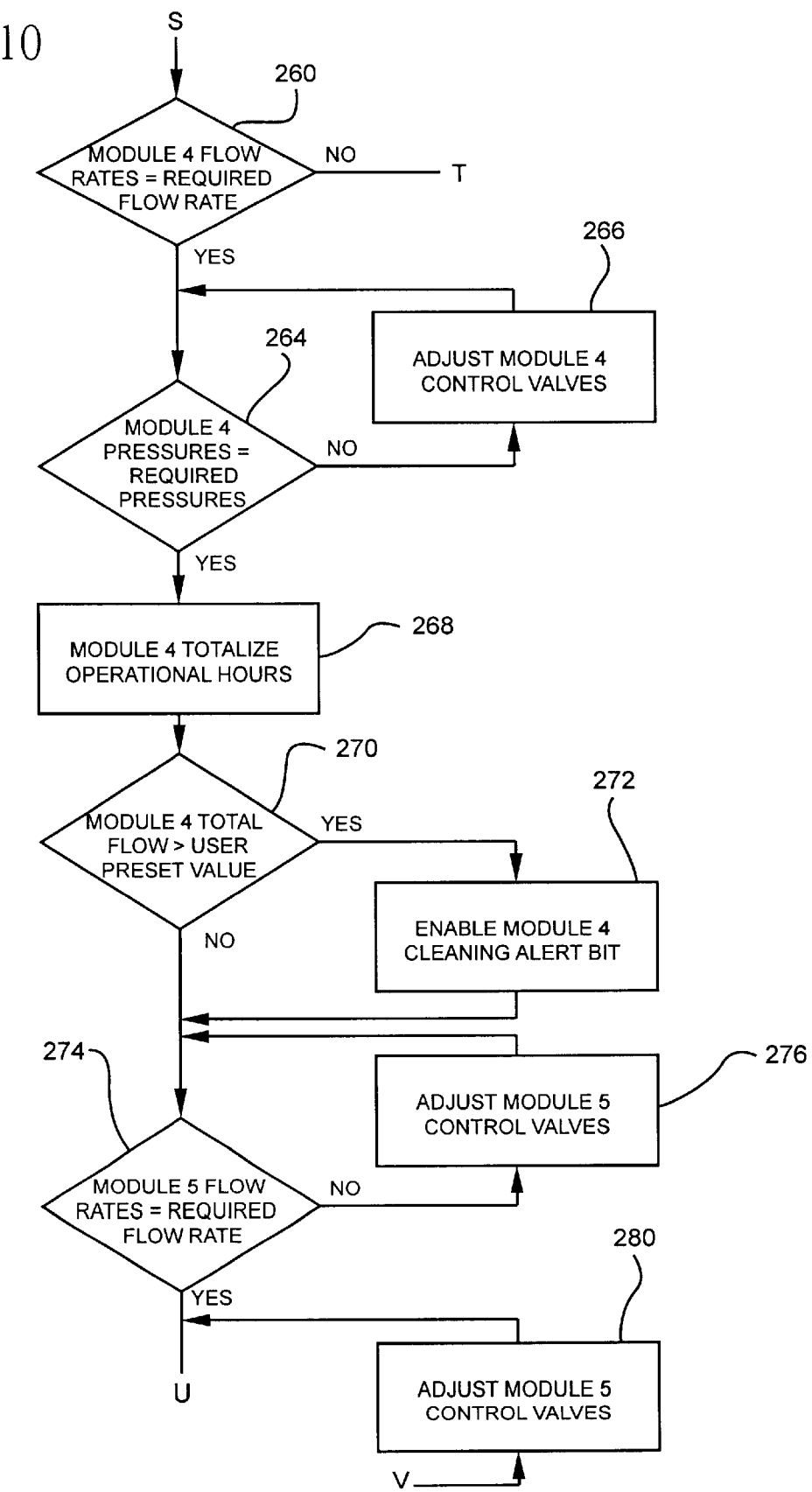

When the module 4 temperature value is not greater than the user pre-set value, a determination is made whether the module 4 flow rates equal the required flow rates at 260 (see FIG. 10). If not, the module 4 control valves are adjusted at 262, and it is again considered whether the module 4 flow rates equal the required flow rates. Thus, when needed, the module 4 control valves will be continually adjusted until the measured module 4 flow rates equal the required flow rates.

Once the module 4 flow rates equal the required flow rates, a determination is made whether module 4 pressures equal the required pressures at 264. If not, the module 4 control valves are adjusted at 266, and it is again considered whether the module 4 pressures equal the required pressures. Thus, when needed, the module 4 control valves will be continually adjusted until the measured module 4 pressures equal the required pressures.

Once the module 4 pressures equal the required pressures, the module 4 total operation hours is measured at 268. A determination is made whether the module 4 total flow is greater than a user pre-set value at 270 and if so, the module 4 cleaning alert bit is enabled at 272.

If the module 4 total flow is not greater than the user pre-set value, or after the operator indicator is enabled, a determination is made whether the module 5 flow rates equal the required flow rates at 274. If not, the module 5 control valves are adjusted at 276, and it is again considered whether the module 5 flow rates equal the required flow rates. Thus, when needed, the module 5 control valves will be continually adjusted until the measured module 5 flow rates equal the required flow rates.

Figure 11:
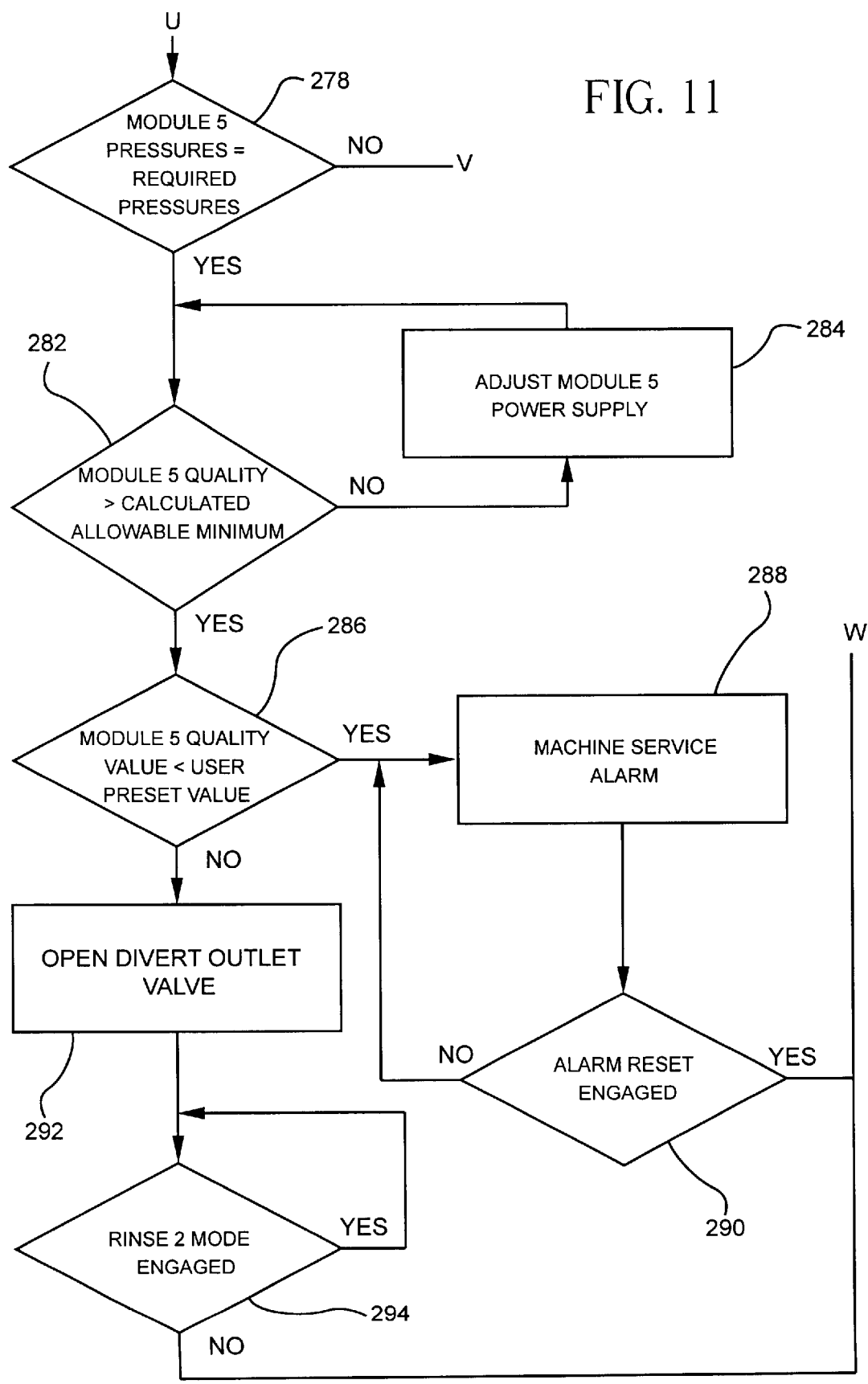
Figure 12:
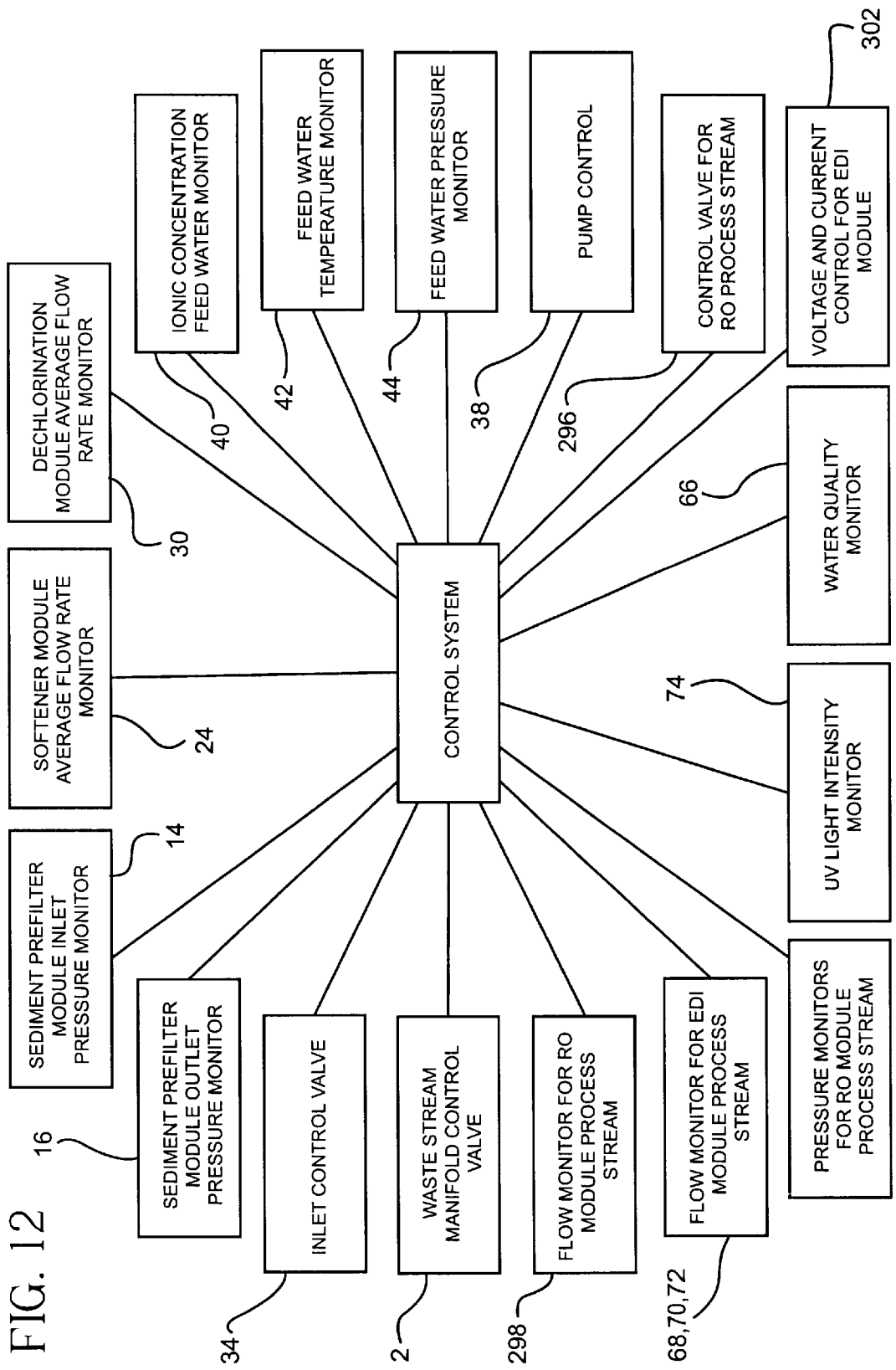
FIG. 12 is a diagram showing the connection of various components of a water purifier in accordance with the invention to the control system.

Once the module 5 flow rates equal the required flow rates, a determination is made whether module 5 pressures equal the required pressures at 278 (see FIG. 11). If not, the module 5 control valves are adjusted at 280, and it is again considered whether the module 5 pressures equal the required pressures. Thus, when needed, the module 5 control valves will be continually adjusted until the measured module 5 pressures equal the required pressures.

After the measured module 5 pressures equal the required pressures, a determination is made whether the module 5 quality is greater than the calculated allowable minimum at 282. If not, the module 5 power supply is adjusted at 284 and it is again considered whether the module 5 quality is greater than the calculated allowable minium. Thus, when needed, the module 5 power supply will be continually adjusted until the module 5 quality is greater than the calculated allowable minimum.

Once the measured module 5 quality is greater than the calculated allowable minimum, a determination is made whether the module 5 quality value is less than a user pre-set value at 286. If so, a service alarm is sound at 288. After the alarm sounds, a determination is made whether the alarm reset is engaged at 290, i.e., a response to the alarm was effected. If not, the alarm continues to sound. Instead of an alarm, any type of warning device, oral and/or visual, can be used. After the alarm reset is engaged, the operating sequence returns to again check the service mode at 216.

If the measured module 5 quality value is not less than the user pre-set value, a divert outlet valve is opened at 292 and provides a stream of purifier water through the divert outlet valve.

A determination is periodically made whether the second rinse mode is engaged at 294, i.e., whether the rinse cycle is still desired. Once the rinse mode is no longer engaged, the operating sequence returns to check the service mode at 216.

Water purifiers in accordance with the invention can be constructed to provide variable output flow rates. In practice, water purifiers have been designed to provide output flow rates from about 0.5 gallons per minute to about 50 gallons per minute. The significant difference between the different models of the water purifier is the size of the components, with the type and function of components being substantially the same for all of the different models.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A water purifier for purifying supply water, comprising:
   a softener module arranged to receive the supply water and remove metallic ions from the water, said softener module comprising at least one tank containing sodium form ion exchange resins such that upon flow of the water through said at least one tank, calcium and magnesium ions react with said sodium resins and are removed from the water;
   regeneration means associated with said at least one tank for regenerating the sodium ion resins in said at least one tank;
   a de-chlorination module arranged to receive water from said softener module and remove oxidizing and organic compounds from the water;
   a control valve arranged downstream of said de-chlorination module for regulating flow of water from said de-chlorination module;
   a reverse osmosis module arranged downstream of said control valve and comprising reverse osmosis membranes which purify the water upon flow of water through said membranes;

a pump arranged between said control valve and said reverse osmosis module arranged to pump water at a high pressure through said reverse osmosis module;

an electrodeionization (EDI) module arranged to receive water from said reverse osmosis module and remove ions from the water to provide a stream of pure water;

a control system for controlling operation of said softener module, said de-chlorination module, said control valve, said reverse osmosis module, said pump, said electrodeionization module and said ultraviolet sterilization module to optimize purification of the supply water;

a first flow monitor associated with said softener module for measuring rate of flow of water into said softener module, said first flow monitor being coupled to said control system, said control system being structured and arranged to determine processing capacity of said softener module based on the measured flow rate and initiate regeneration of the sodium ion resins based on analysis of the determined processing capacity of said softener module and a pre-determined capacity of the sodium ion resins; and means for providing three streams of water from said reverse osmosis module into said electrodeionization module, the three streams of water being an EDI process stream, an EDI electrode stream and an EDI concentrate stream, said electrodeionization module including three flow monitors, each arranged to measure rate of flow of a respective one of the three streams of water, said three flow monitors being coupled to said control system, said control system being structured and arranged to calculate optimum required flow rates for each stream and adjust control valves to change at least one of the flow rate and pressure of each of the three streams to maintain operation of said electrodeionization module within allowable operating margins.

2. The water purifier of claim 1, further comprising a frame, said softener module, said de-chlorination module, said control valve, said reverse osmosis module, said pump and said electrodeionization module being arranged in connection with said frame.

3. The water purifier of claim 1, further comprising a frame having an interior space, said softener module, said de-chlorination module, said control valve, said reverse osmosis module, said pump and said electrodeionization module being arranged in said interior space of said frame.

4. The water purifier of claim 1, wherein said de-chlorination module comprises tubular housings and solid block, activated carbon elements arranged in said tubular housings.

5. The water purifier of claim 4, wherein said carbon elements are encased in a polypropylene membrane.

6. The water purifier of claim 4, wherein said de-chlorination module further comprises ultraviolet lamps each arranged in a center of a respective one of said tubular housings.

7. The water purifier of claim 4, further comprising a second flow monitor associated with said de-chlorination module for measuring rate of flow of water into said de-chlorination module, and an indicator visible from exterior of the water purifier, said second flow monitor being coupled to said control system to enable said control system to determine processing capacity of said carbon elements and control said indicator to provide an indication when replacement of said carbon elements is required.

8. The water purifier of claim 1, further comprising:
a water quality monitor for measuring ionic concentration in the water;
a temperature monitor for measuring temperature of the water; and
a pressure monitor for measuring pressure of the water;
said water quality monitor, said temperature monitor and said pressure monitor being coupled to said control system and said control system being structured and arranged to activate an indicator or alarm when the measured ionic concentration, temperature or pressure of the water is outside of an operational range.

9. The water purifier of claim 1, wherein said control system is structured and arranged to monitor time of operation of said pump and activate an indicator or alarm when maintenance of said pump is required or when said pump has malfunctioned.

10. The water purifier of claim 1, wherein said reverse osmosis module separates water into purified water and concentrated wastewater, said concentrated wastewater being divided into a recycle stream and a waste stream, said recycle stream being directed into said pump.

11. The waste purifier of claim 1, further comprising a water quality monitor for measuring ionic concentration in pure water outlet from said electrodeionization module, said water quality monitor being coupled to said control system, said control system calculating required electrical voltage and current required by said electrodeionization module and automatically adjusting each to achieve optimum outlet water quality.

12. The water purifier of claim 1, further comprising a sediment pre-filter module for receiving the supply water and removing particles therefrom, water being directed from said sediment pre-filter module to said softener module, said control system being coupled to said sediment pre-filter module for controlling said sediment pre-filter module.

13. The water purifier of claim 12, wherein said sediment pre-filter module comprises tubular ceramic elements with a specific pore size for trapping particles on the surface of said ceramic elements.

14. The water purifier of claim 13, wherein said sediment pre-filter module further comprises stainless steel or polypropylene tubular element housings, said ceramic elements being arranged in said tubular element housings.

15. The water purifier of claim 13, further comprising a first pressure sensor for measuring pressure of said ceramic elements at an inlet end of said sediment pre-filter module and a second pressure sensor for measuring pressure of said ceramic elements at an outlet end of said sediment pre-filter module, said first and second pressure sensors being coupled to said control system and providing pressure readings to said control system, said control system being structured and arranged to analyze said pressure readings and determine when said sediment pre-filter module is performing below a threshold satisfaction level indicative of the need to clean said ceramic elements.

16. The water purifier of claim 1, further comprising an ultraviolet sterilization module arranged to receive water from said electrodeionization module and eliminate bacteria from the water such that a pure water stream is provided from said ultraviolet sterilization module.

17. The water purifier of claim 1, wherein said reverse osmosis module is arranged to separate inlet water into purified water and concentrated wastewater, the concentrated wastewater being divided into a recycle stream and a waste stream, further comprising a conduit connected to said control valve and to said pump, said conduit having an inlet for receiving the recycle stream from said reverse osmosis module such that the recycle stream is blended with feed water being directed through said control valve.

18. A water purifier for purifying supply water, comprising:
   a softener module arranged to receive the supply water and remove metallic ions from the water;
   a de-chlorination module arranged to receive water from said softener module and remove oxidizing and organic compounds from the water;
   a control valve arranged downstream of said de-chlorination module for regulating flow of water from said de-chlorination module;
   a reverse osmosis module arranged downstream of said control valve and comprising reverse osmosis membranes which purify the water upon flow of water through said membranes; said reverse osmosis module including means for separating inlet water into an RO permeate stream and an RO concentrate stream, said RO concentrate stream being divided into a recycle stream and a waste stream;
   a pump arranged between said control valve and said reverse osmosis module arranged to receive the recycle stream from said reverse osmosis module and to pump water at a high pressure through said reverse osmosis module;
   an electrodeionization (EDI) module arranged to receive the RO permeate stream from said reverse osmosis module and remove ions from the water to provide a stream of pure water;
   a control system for controlling operation of said softener module, said de-chlorination module, said control valve, said reverse osmosis module, said pump, said electrodeionization module and said ultraviolet sterilization module to optimize purification of the supply water; and
   means for providing three streams of water from the RO permeate stream into said electrodeionization module, the three streams of water being an EDI process stream, an EDI electrode stream and an EDI concentrate stream, said electrodeionization module including three flow monitors, each arranged to measure rate of flow of a respective one of the three streams of water, said three flow monitors being coupled to said control system, said control system being structured and arranged to calculate optimum required flow rates for each stream and adjust control valves to change at least one of the flow rate and pressure of each of the three streams, when the flow rate differs from the flow rate measured by said flow monitors, to maintain operation of said electrodeionization module within allowable operating margins.

19. The water purifier of claim 18, further comprising:
   a water quality monitor for measuring ionic concentration in the water;
   a temperature monitor for measuring temperature of the water; and
   a pressure monitor for measuring pressure of the water;
   said water quality monitor, said temperature monitor and said pressure monitor being arranged between said reverse osmosis module and said pump and being coupled to said control system and said control system being structured and arranged to activate an indicator or alarm when the measured ionic concentration, temperature or pressure of the water is outside of an operational range.

20. The water purifier of claim 18, further comprising:
   a water quality monitor for measuring ionic concentration in the water;
   a temperature monitor for measuring temperature of the water; and
   a pressure monitor for measuring pressure of the water;
   said water quality monitor, said temperature monitor and said pressure monitor being arranged between said de-chlorination module and said pump and being coupled to said control system and said control system being structured and arranged to activate an indicator or alarm when the measured ionic concentration, temperature or pressure of the water is outside of an operational range.

21. The water purifier of claim 18, wherein said reverse osmosis module comprises a first manifold for collecting the RO permeate stream from said membranes and a second manifold for collecting the RO concentrate stream from said membranes.

22. The waste purifier of claim 18, further comprising a water quality monitor for measuring ionic concentration in pure water outlet from said electrodeionization module, said water quality monitor being coupled to said control system, said control system calculating required electrical voltage and current required by said electrodeionization module and automatically adjusting each to achieve optimum outlet water quality.

23. The water purifier of claim 18, further comprising a conduit connected to said control valve and to said pump, said conduit having an inlet for receiving the recycle stream from said reverse osmosis module such that the recycle stream is blended with feed water being directed through said control valve.

24. The water purifier of claim 18, further comprising a sediment pre-filter module for receiving the supply water and removing particles therefrom, water being directed from said sediment pre-filter module to said softener module, said control system being coupled to said sediment pre-filter module for controlling said sediment pre-filter module.

25. The water purifier of claim 18, further comprising a first pressure sensor for measuring pressure of said ceramic elements at an inlet end of said sediment pre-filter module and a second pressure sensor for measuring pressure of said ceramic elements at an outlet end of said sediment pre-filter module, said first and second pressure sensors being coupled to said control system and providing pressure readings to said control system, said control system being structured and arranged to analyze said pressure readings and determine when said sediment pre-filter module is performing below a threshold satisfaction level indicative of the need to clean said ceramic elements.

26. The water purifier of claim 18, further comprising an ultraviolet sterilization module arranged to receive water from said electrodeionization module and eliminate bacteria from the water such that a pure water stream is provided from said ultraviolet sterilization module.

27. The water purifier of claim 18, wherein said softener module comprises at least one tank containing sodium form ion exchange resins such that upon flow of the water through said at least one tank, calcium and magnesium ions react with said sodium resins and are removed from the water.

28. The water purifier of claim 27, further comprising regeneration means associated with said at least one tank for regenerating the sodium ion resins in said at least one tank.

29. The water purifier of claim 28, further comprising a first flow monitor associated with said softener module for measuring rate of flow of water into said softener module, said first flow monitor being coupled to said control system to enable said control system to determine processing capacity of said softener module based on the measured flow rate and initiate regeneration of the sodium ion resins based on analysis of the determined processing capacity of said softener module and a pre-determined capacity of the sodium ion resins.

* * * * *